(12) United States Patent
Korus

(10) Patent No.: US 9,186,934 B2
(45) Date of Patent: Nov. 17, 2015

(54) WHEEL AND TIRE ASSEMBLY

(71) Applicant: Lindsay Corporation, Omaha, NE (US)

(72) Inventor: Thomas J. Korus, Lindsay, NE (US)

(73) Assignee: Lindsay Corporation, Omaha, NE (US)

( * ) Notice: Subject to any disclaimer, the term of this patent is extended or adjusted under 35 U.S.C. 154(b) by 482 days.

(21) Appl. No.: 13/625,042

(22) Filed: Sep. 24, 2012

(65) Prior Publication Data

US 2014/0083585 A1 Mar. 27, 2014

(51) Int. Cl.
*B60C 7/10* (2006.01)
*B60C 11/03* (2006.01)
*B60C 7/22* (2006.01)
*B60C 7/24* (2006.01)

(52) U.S. Cl.
CPC ............... *B60C 11/0311* (2013.04); *B60C 7/10* (2013.01); *B60C 7/102* (2013.04); *B60C 7/22* (2013.01); *B60C 7/24* (2013.01)

(58) Field of Classification Search
CPC .............. B60B 9/00; B60B 9/04; B60B 9/10; B60C 7/00; B60C 7/10; B60C 7/14
USPC ........................................ 152/5, 7, 11, 40, 47
See application file for complete search history.

(56) References Cited

U.S. PATENT DOCUMENTS

| | | |
|---|---|---|
| 2,713,373 A | 7/1955 | Daugherty |
| 3,114,408 A | 12/1963 | Ross |
| 3,164,417 A | 1/1965 | Howes |
| 3,565,490 A | 2/1971 | Statz |
| 3,843,202 A * | 10/1974 | Lacerte ..................... 301/64.701 |
| 3,930,527 A | 1/1976 | French |
| 4,051,883 A | 10/1977 | Ippen et al. |
| 4,549,592 A | 10/1985 | Schroder |
| 4,561,481 A | 12/1985 | Kawauchi et al. |
| 4,921,029 A | 5/1990 | Palinkas et al. |
| 4,944,563 A * | 7/1990 | Pinchbeck et al. ........ 301/64.303 |
| 6,089,292 A | 7/2000 | Hill, III |
| 6,131,833 A * | 10/2000 | Chapman ....................... 239/728 |
| 6,142,203 A * | 11/2000 | Bickford ........................ 152/302 |
| 6,431,235 B1 | 8/2002 | Steinke |

(Continued)

FOREIGN PATENT DOCUMENTS

| | | |
|---|---|---|
| EP | 1671811 A1 | 6/2006 |
| EP | 2338695 A1 | 6/2011 |

(Continued)

OTHER PUBLICATIONS

European Patent Office Application No. 1318742.8; Search Report dated Dec. 13, 2013.

*Primary Examiner* — S. Joseph Morano
*Assistant Examiner* — Jean Charleston
(74) *Attorney, Agent, or Firm* — Hovey Williams LLP

(57) ABSTRACT

A wheel assembly includes a rigid wheel and an airless tire configured to present some performance characteristics of a pneumatic tire. The wheel includes a pair of radially outermost axially spaced rim portions, each rim portion including a transversely flat outer surface extending at least partially around the circumference of the wheel. The tire is mounted on the wheel such that the tire engages the outer surfaces of the rim portions of the wheel. A central portion of the tire is configured to flex inwardly between the rim portions of the wheel in response to ground engaging pressure, thus minimizing ground penetration and soil disturbance during use.

11 Claims, 22 Drawing Sheets

(56) References Cited

U.S. PATENT DOCUMENTS

| | | |
|---|---|---|
| 6,502,612 B2 | 1/2003 | Hsiao |
| 6,616,374 B2 * | 9/2003 | Starr ............................... 405/36 |
| 6,679,306 B2 | 1/2004 | Steinke |
| 6,971,426 B1 | 12/2005 | Steinke |
| 6,974,519 B2 | 12/2005 | Steinke et al. |
| 7,726,370 B2 * | 6/2010 | Sauerwald et al. ........... 152/246 |
| 2011/0003920 A1 | 1/2011 | Matsuda et al. |

FOREIGN PATENT DOCUMENTS

| | | | |
|---|---|---|---|
| EP | 2397342 A1 * | 12/2011 | ................ B60C 7/10 |
| FR | 2294866 A1 | 7/1976 | |

* cited by examiner

WHEEL AND TIRE ASSEMBLY

BACKGROUND

1. Field

Embodiments of the present invention relate to wheel and tire assemblies. More particularly, embodiments of the present invention relate to wheel and tire assemblies including airless tires presenting certain performance characteristics of pneumatic tires.

2. Related Art

Mobile irrigation systems include elevated water conduits supported by mobile towers. Such mobile towers are mounted on wheels that propel the towers along the ground to be irrigated. The wheels typically include pneumatic tires that require periodic maintenance, including adjusting air pressure, repairing tires that develop holes or other damage, and replacing worn or damaged tires that are beyond repair.

Because irrigation systems and similar agricultural equipment are typically used in fields or other remote locations, monitoring the tires for problems and reaching the tires to perform maintenance and repairs can be inconvenient or difficult. If a tire loses air pressure and is not repaired in a timely manner, damage to the tire, to the equipment mounted on the tire, or both may result.

One solution to the challenges presented by the use of pneumatic tires involves using wheels without tires. While this approach addresses most of the problems of tire maintenance, repair and replacement, it presents other challenges. Tireless wheels, for example, are rigid and experience greater ground penetration than a pneumatic tire, thereby creating ruts or otherwise disturbing the ground more than a pneumatic tire. The problems associated with ground disturbance are compounded with the use of irrigation systems, where the ground is moist and more susceptible to disturbance rutting, and where the irrigation system wheels may traverse the same path multiple times. Similar problems exist for tractors, automobiles, and other vehicles that typically use pneumatic tires.

Accordingly, there is a need for a solution which overcomes the limitations described above.

SUMMARY

Embodiments of the present invention solve the above-described problems by providing a wheel and tire assembly including an airless tire that presents certain performance characteristic of a pneumatic tire. In particular, the wheel assembly is configured such that the tire flexes inwardly in response to ground engaging pressure thereby minimizing ground penetration and soil disturbance.

A wheel assembly in accordance with an embodiment of the invention comprises a rigid wheel and an airless, flexible tire mounted on the wheel. The wheel includes a pair of radially outermost axially spaced rim portions, each rim portion including a transversely flat outer surface extending at least partially around the circumference of the wheel. The tire is mounted on the wheel such that the tire engages the outer surfaces of the rim portions of the wheel. A central portion of the tire is configured to flex inwardly between the rim portions of the wheel in response to ground engaging pressure.

A wheel assembly in accordance with another embodiment of the invention also comprises a rigid wheel and a flexible, airless tire mounted on the wheel. The wheel includes a pair of radially outermost axially spaced rim portions and a channel between the rim portions, wherein each rim portion includes a cylindrical outer surface parallel with an axis of rotation of the wheel. The rim portions are uniform in diameter and coaxial, and the cylindrical outer surfaces present a combined width that is at least one-third of a total width of the wheel. The wheel includes a plurality of circumferentially spaced receptacles.

The tire is mounted on the wheel such that the tire engages the outer surfaces of the rim portions of the wheel. A portion of the tire is configured to flex inwardly between the rim portions of the wheel in response to ground engaging pressure. The tire includes a cylindrical body and a flange extending radially inwardly from the body into the channel such that the flange engages an inner wall of the cavity. The tire further includes a plurality of drive lugs extending radially inwardly from the body and engaging the receptacles.

A wheel assembly in accordance with yet another embodiment of the invention comprises a rigid wheel including a pair of radially outermost axially spaced rim portions and a channel between the rim portions, wherein the channel is defined by a wall including opposing side wall segments. Each of the opposing side wall segments includes a plurality of apertures representing at least twenty percent of the total area of each of the side wall segments, and each rim portion includes a cylindrical outer surface parallel with an axis of rotation of the wheel. The outer surfaces present a combined width that is at least one-fourth of the total width of the wheel.

An airless flexible tire is mounted on the wheel. The tire includes opposed axial side portions engaging the rim portions of the wheel, and an axially central portion configured to deflect inwardly between the rim portions of the wheel in response to ground engaging pressure. A tension element is associated with the tire between the rim portions, wherein the tension element is more resilient than the tire and configured to enable the axially central portion of the tire to return to a normal position after deflecting inwardly.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

Figure 1:
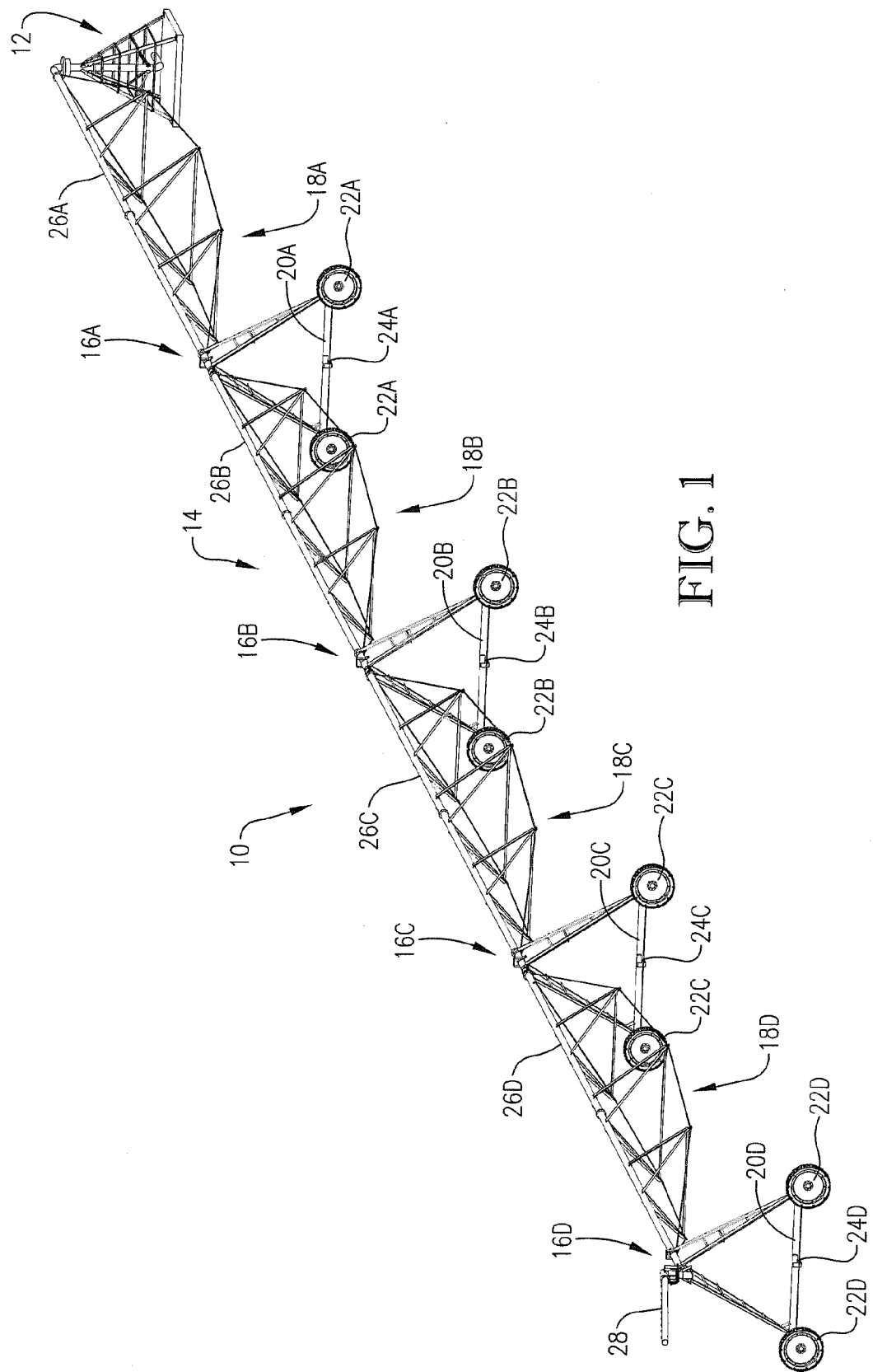
FIG. 1 is a perspective view of an exemplary irrigation system including wheel assemblies constructed in accordance with embodiments of the invention.
Figure 2:
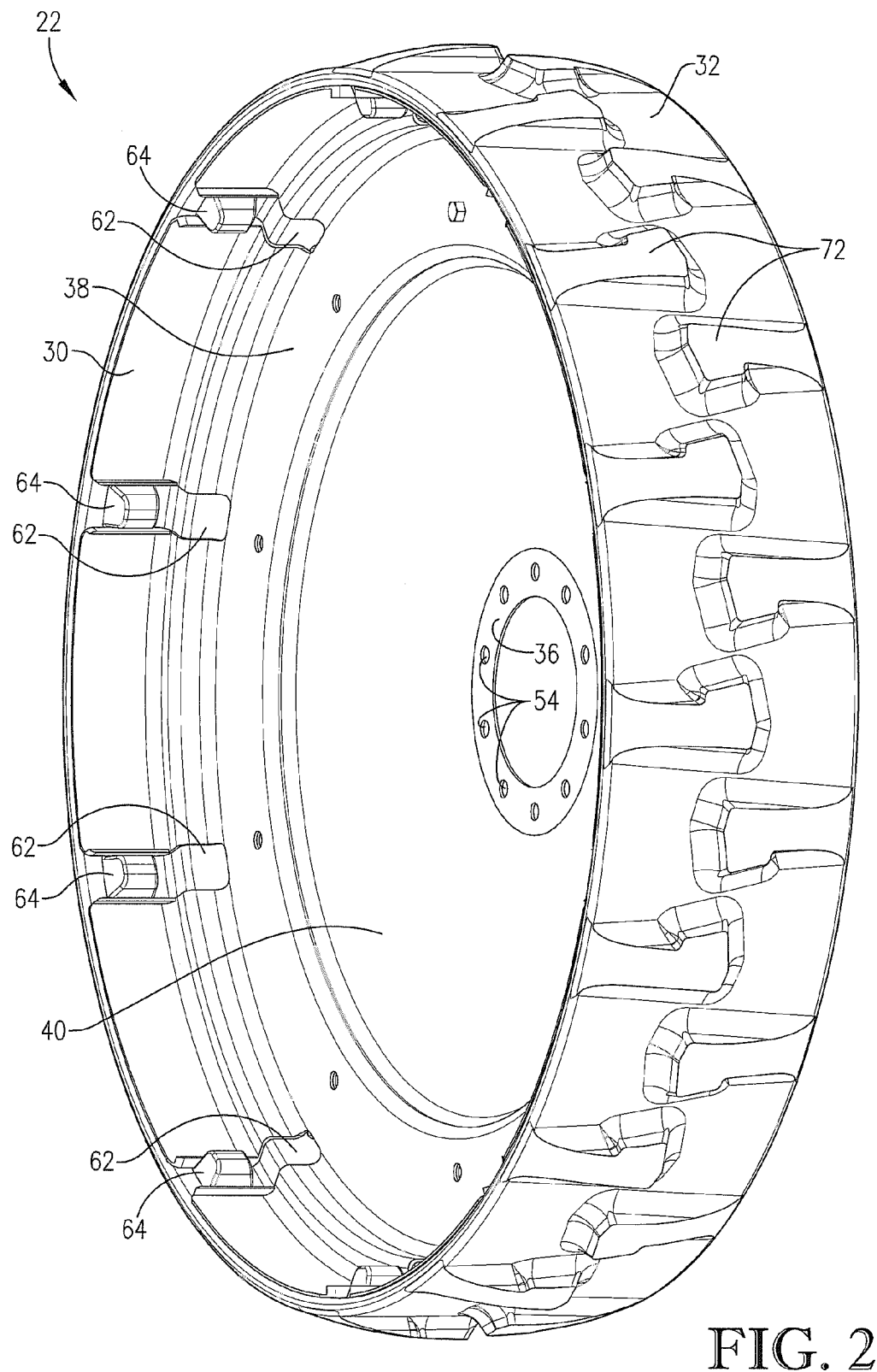
FIG. 2 is a perspective first side view of a first wheel assembly constructed in accordance with embodiments of the invention and useful with the irrigation system of FIG. 1, the wheel assembly including a rigid wheel and a flexible airless tire mounted on the wheel.
Figure 3:
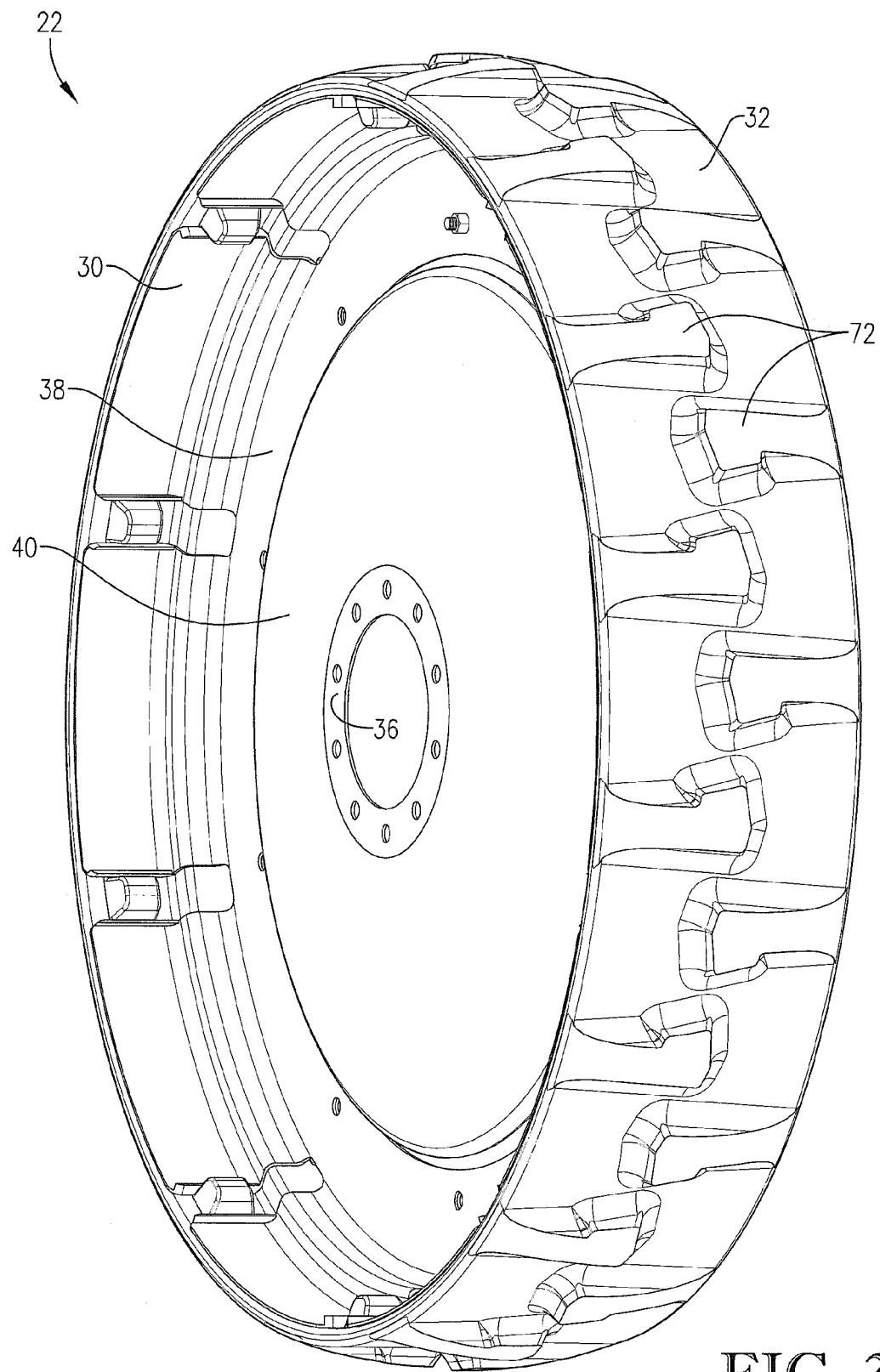
FIG. 3 is a perspective second side view of the wheel assembly of FIG. 2.
Figure 4:
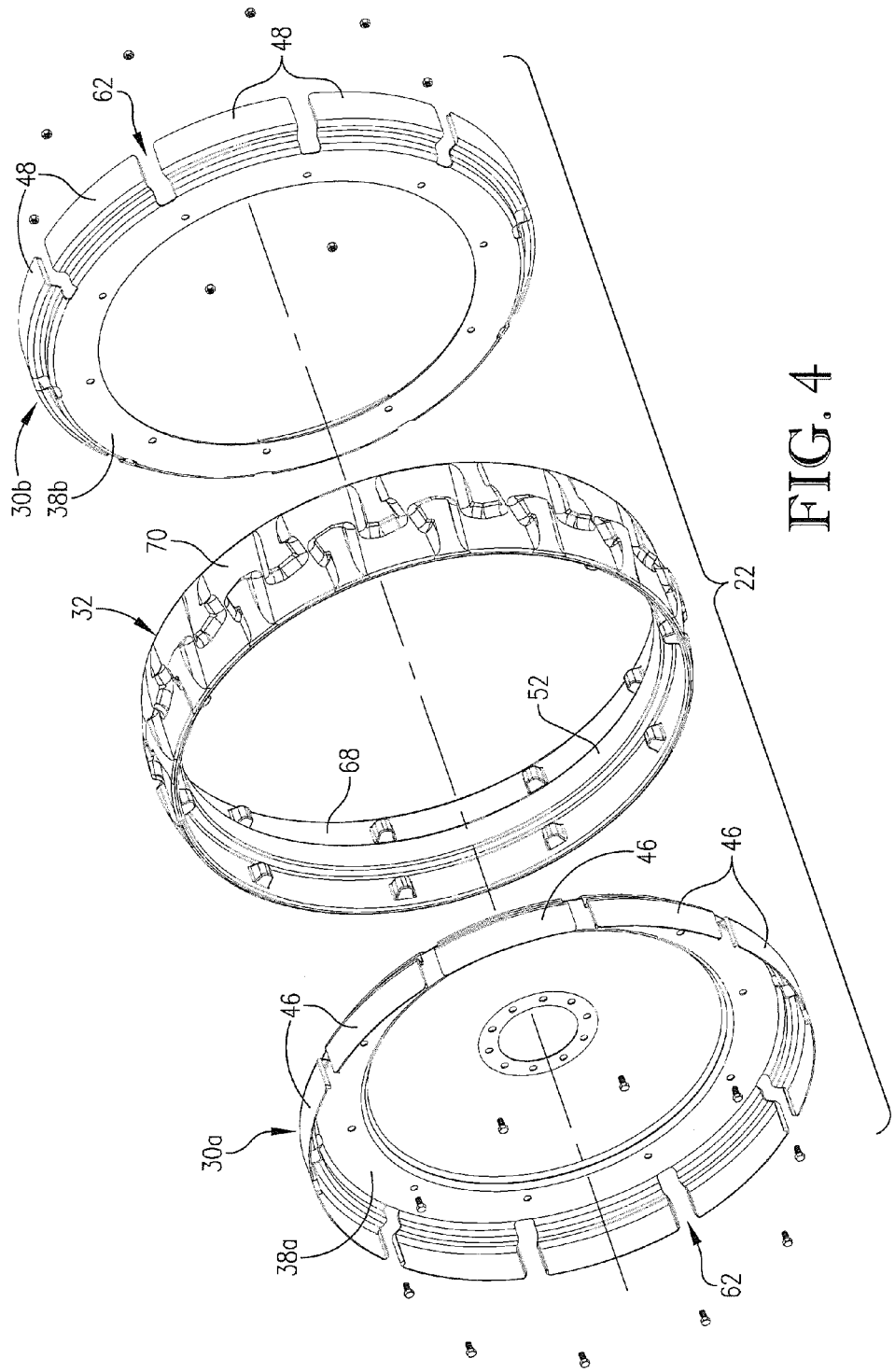
FIG. 4 is an exploded view of the wheel assembly of FIG. 2, illustrating first and second sides of the wheel.
Figure 5:
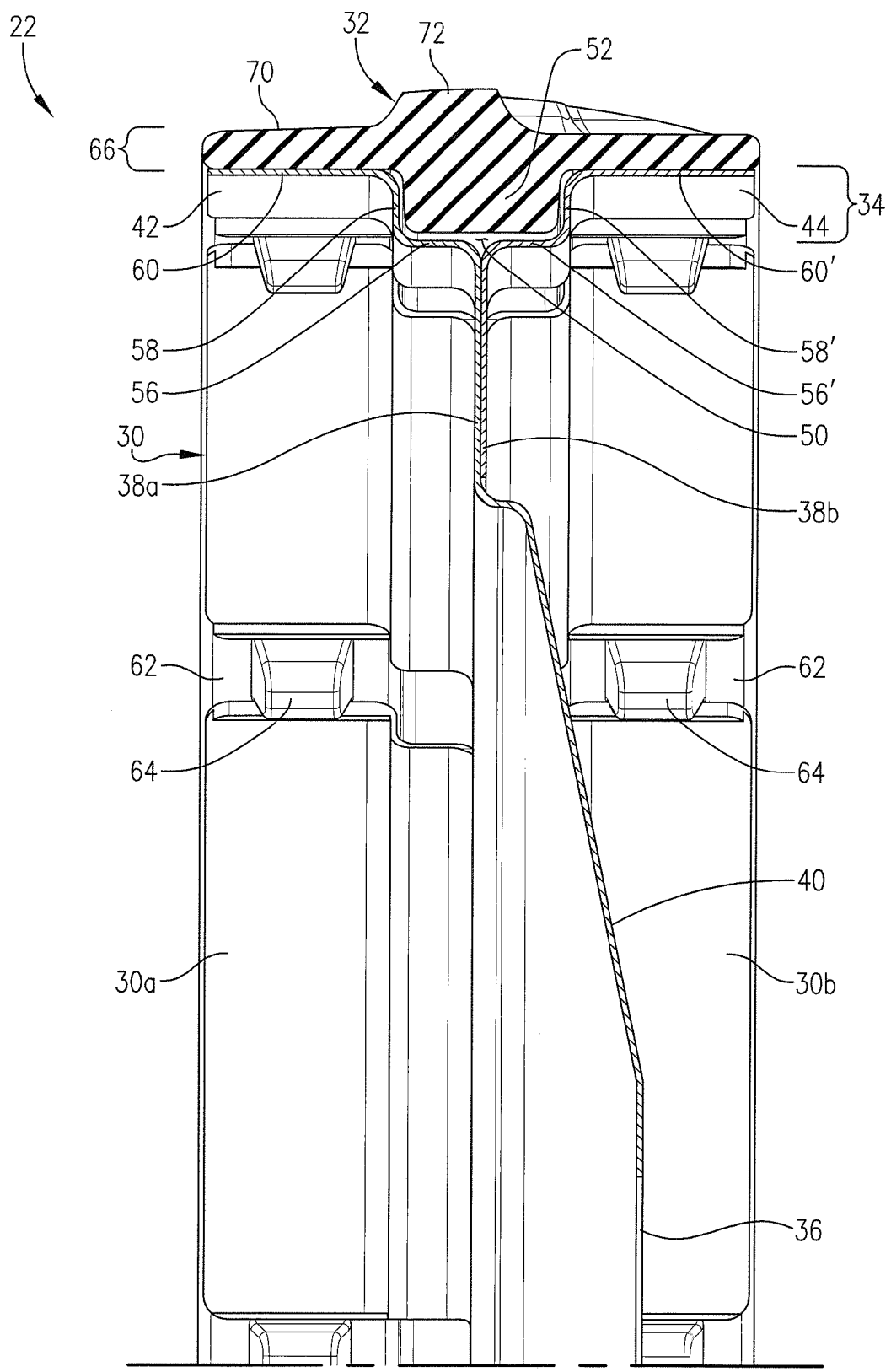
FIG. 5 is a fragmentary cross-sectional view of the wheel assembly of FIG. 2, illustrating a longitudinal flange of the tire engaging a channel of the wheel.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, and initially FIG. 1, an exemplary irrigation system 10 is illustrated including a plurality of wheel assemblies constructed in accordance with embodiments of the invention. The illustrated irrigation system 10 is a central pivot irrigation system that broadly comprises a fixed central pivot 12 and a main section 14 pivotally connected to the central pivot 12. The irrigation system 10 may also comprise an extension arm (also commonly referred to as a "swing arm" or "corner arm") pivotally connected to the free end of the main section.

The fixed central pivot 12 may be a tower or any other support structure about which the main section 14 may pivot. The central pivot 12 has access to a well, water tank, or other source of water and may also be coupled with a tank or other source of agricultural products to inject fertilizers, pesticides and/or other chemicals into the water for application during irrigation.

The main section 14 may comprise a number of mobile support towers 16A-D, the outermost 16D of which is referred to herein as an "end tower". The support towers are connected to the fixed central pivot 12 and to one another by truss sections 18A-D or other supports to form a number of interconnected spans. The irrigation system 10 illustrated in FIG. 1 includes four mobile support towers 16A-D; however, it may comprise any number of mobile support towers without departing from the scope of the present invention.

Each mobile tower may include a drive tube 20A-D on which a pair of wheel assemblies 22A-D is mounted. Embodiments of the wheel assemblies 22A-D are described in more detail below. A drive motor 24A-D is mounted to each drive tube 20A-D for driving the wheel assemblies 22A-D. The motors 24A-D may include integral or external relays so they may be turned on, off, and reversed. The motors may also have several speeds or be equipped with variable speed drives.

Each of the truss sections 18A-D carries or otherwise supports a conduit section 26A-D or other fluid distribution mechanism that is connected in fluid communication with all other conduit sections. A plurality of sprinkler heads, spray guns, drop nozzles, or other fluid-emitting devices are spaced along the conduit sections 26A-D to apply water and/or other fluids to land underneath the irrigation system.

The irrigation system 10 may also include an optional extension arm (not shown) pivotally connected to the end tower 16D and supported by a swing tower with steerable wheels driven by a motor. The extension arm may be joined to the end tower by an articulating pivot joint. The extension arm is folded inward relative to the end tower when it is not irrigating a corner of a field and may be pivoted outwardly away from the end tower while irrigating the corners of a field.

The irrigation system 10 may also include one or more high pressure sprayers or end guns 28 mounted to the end tower 16D or to the end of the extension arm. The end guns 28 may be activated at the corners of a field or other designated areas to increase the amount of land that can be irrigated.

It will be appreciated that the irrigation system 10 is illustrated and described herein as one exemplary implementation of the wheel assemblies 22 described in detail below. Other, equally preferred implementations of the wheel assemblies 22 not shown or discussed in detail herein may include, without limitation, other types of irrigation systems, such as lateral irrigation systems, other types of agricultural equipment, such as wagons, carts, implements, and so forth, or other types of vehicles such as buses, trucks, and automobiles. However, embodiments of the invention are especially suited for irrigation systems and other vehicles or systems that travel over un-paved or un-finished ground.

Referring now to FIGS. 2-11, a wheel assembly 22 constructed in accordance with a first embodiment of the invention is illustrated. The wheel assembly 22 broadly comprises a rigid wheel 30 and a flexible airless tire 14 mounted on the wheel 30. The wheel 30 comprises a tire engaging portion 34, a hub 36, a flange portion 38, and a web portion 40 interconnecting the hub 36 and the flange portion 38. The tire engaging portion 34 is configured to engage and support the tire 32 and to allow a portion of the tire 32 to flex radially inwardly in response to ground engaging pressure, thus presenting some performance characteristics of a pneumatic tire and minimizing ground penetration during use. More particularly, the tire engaging portion 34 presents a pair of axially spaced rim portions 42, 44 configured to engage and support corresponding sides of the tire 32. Each of the rim portions 42, 44 presents a radially outer surface 46, 48 that extends substantially entirely around the circumference of the wheel 30, being interrupted only by a plurality of receptacle apertures, as explained below.

Each of the outer surfaces 46, 48 of the rim portions 42, 44 presents a cylindrical shape, is parallel with an axis of rotation of the wheel 30 and generally conforms in shape and size to a corresponding portion of an inner surface of the tire 32. As used herein, a cylindrical shape may be continuous or discontinuous, and is parallel with the axis of rotation of the wheel 30 if the axis of the cylindrical shape is parallel with the axis of rotation of the wheel 30. A central recessed area of the tire engaging portion 34 of the wheel defines a channel 50 extending around the wheel 30. The channel 50 receives a flange 52 of the tire 32 that is configured in shape and size to extend into and engage the channel 50. The tire 32 is configured such that at least a portion of the tire 32 deflects into the channel 50 in response to ground engaging pressure, thereby mitigating ground penetration and soil disturbance during use.

In the illustrated embodiment, the wheel 30 comprises two generally symmetric axial sides 30a, 30b separably joined at an axial center of the wheel 30. A first side 30a of the wheel includes the hub 36, the web portion 40, a first flange 38a, and a first side of the tire engaging portion 34. The hub 36 corresponds to a radially innermost portion of the wheel 30 and includes a plurality of apertures 54 for receiving threaded wheel studs or other mounting elements or fasteners for securing the wheel 30 to a piece of equipment, such as a mobile irrigation tower or a wagon. The first flange 38a includes a plurality of apertures or is otherwise configured to receive fasteners, such as bolts, that secure the flange 38a to a second flange 38b associated with the second side 30b of the wheel 30. The illustrated flange 38a is generally perpendicular or nearly perpendicular to the axis of rotation of the wheel 30.

The second side 30b of the wheel is symmetrically identical to corresponding portions of the first side 30a of the wheel and includes the second flange 38b and a second side of the tire engaging portion 34. In the illustrated embodiment, the second side 30b of the wheel does not include a hub or a web portion. The first flange 38a on the first side 30a of the wheel and the second flange 38b on the second side 30b of the wheel are configured such that when the wheel 30 is assembled the flanges 38a, 38b engage one another and serve as a point of connection.

Referring initially to the first side 30a, the tire engaging portion 34 includes an inner rim wall 56 extending axially outwardly from a radially outer edge of the flange 38a, being approximately perpendicular to the flange 38a and forming a generally cylindrical structure that is parallel with the axis of rotation of the wheel 30. In the illustrated embodiment, at least a portion of the inner wall 56 is transversely flat. A connecting segment 58 extends radially outwardly from an outer edge of the inner rim wall 56 and is approximately perpendicular to the inner wall 56 and parallel with the flange 38a. An outer rim wall 60 extends axially outwardly from a radially outer edge of the connecting segment 58, is generally perpendicular to the flange 38a and to the connecting segment 58, and forms a generally cylindrical structure that is parallel with the axis of rotation of the wheel 30. In the illustrated embodiment, at least a portion of the outer rim wall 60 is transversely flat. The outer surface 46 of the outer rim wall 60 is generally transversely flat, extends around the circumference of the wheel 30 except as interrupted by the receptacles, and presents a cylindrical shape that is parallel with the axis of rotation of the wheel 30. Inner rim wall 56', connecting segment 58' and outer rim wall 60' of the second side 30b of the wheel may be similarly or identically configured to the corresponding elements of the first side 30a of the wheel.

As used herein, a portion of the wheel 30 or the tire 32 is "transversely flat" if it follows a straight line that is contained within a plane that is parallel with and intersects the axis of rotation of the wheel 30. Thus, a portion of the wheel 30 or tire 32 that is transversely flat may or may not be parallel with the axis of rotation of the wheel 30 or with the ground.

The inner rim walls 56 and 56', the connecting segments 58 and 58', and the outer rim walls 60 and 60', are continuous around the wheel 30 except for apertures or recesses that correspond to a plurality of receptacles 62. The receptacles 62 may be defined by apertures or recesses in the inner walls 56 and 56', the connecting segments 58 and 58', the outer walls 60 and 60', or a combination thereof. The receptacles 62 are configured to receive and engage drive lugs 64 on the tire 32 to prevent the tire 32 from shifting, either rotationally or laterally, relative to the wheel 30. The tire 32 may include any number of drive lugs 64, including only a single drive lug, but preferably includes between four and twenty drive lugs approximately evenly spaced circumferentially around the wheel assembly 22. In the illustrated embodiment, the tire 32 includes ten drive lugs 64 extending radially inwardly from the tire in pairs spaced around the wheel assembly 22 at intervals of approximately thirty-six degrees. As used herein, if elements of the wheel assembly 22 are "circumferentially spaced" the elements are spaced longitudinally around the wheel assembly 22 with a certain angular separation, regardless of whether the elements are.

The tire 32 is an airless flexible tire made of rubber, plastic or other flexible material sufficiently durable for the rigors of agricultural use yet malleable enough to flex inward in response to ground engaging pressure. The tire 32 may flex inward by bending, compressing or both. As used herein, a "tire" is a flexible component positioned and configured to engage the ground during use of the wheel assembly 22. An "airless tire" is a tire that does not require trapped or compressed air for normal and proper use. An airless tire may be constructed of a single, seamless, unitary piece of material or multiple pieces of material.

Figure 6:
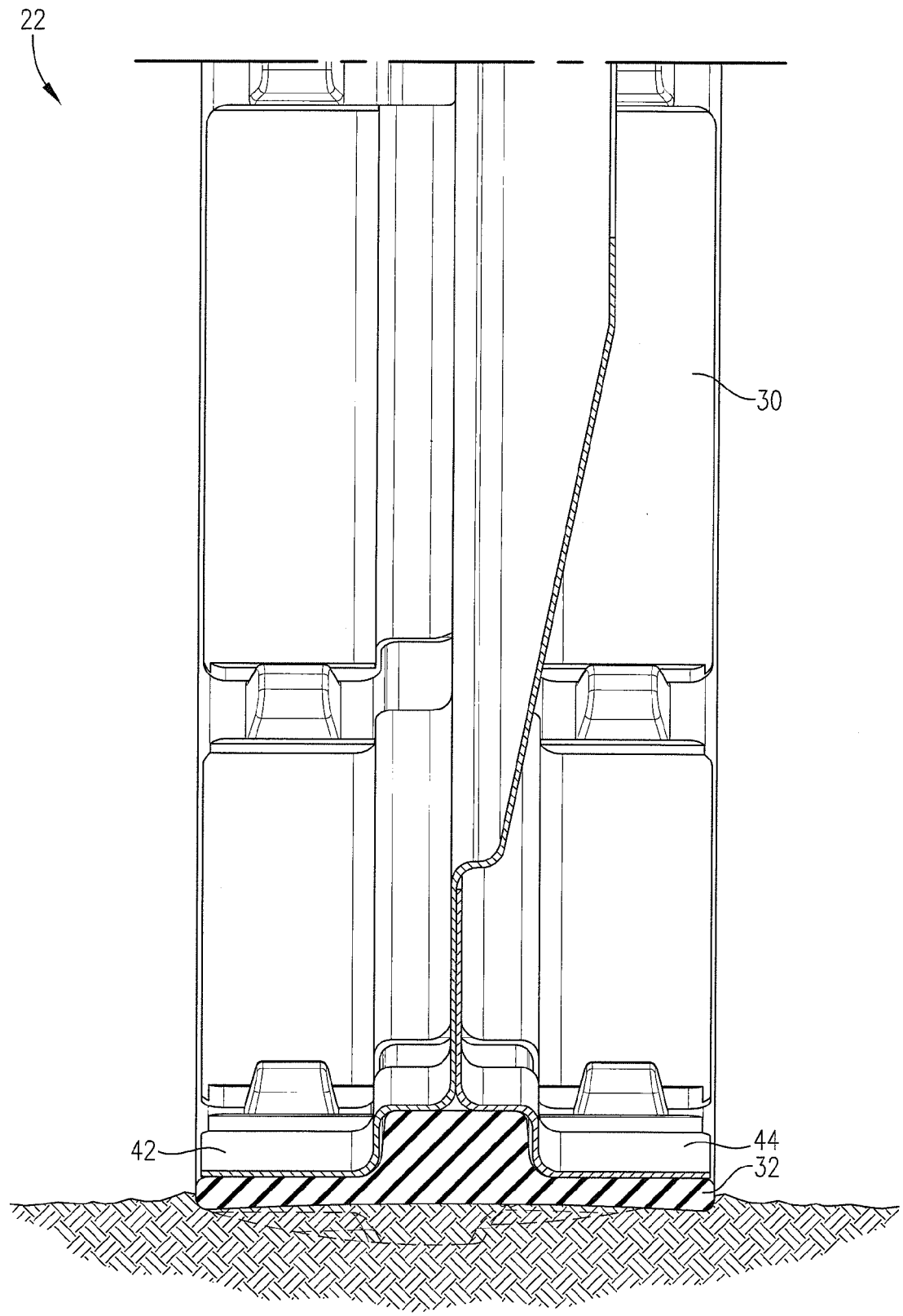
FIG. 6 is a fragmentary cross-sectional view of the wheel assembly of FIG. 2, illustrating the tire engaging the ground and flexing inwardly in response to ground engaging pressure.

The tire 32 comprises a generally cylindrical body 66 with an inner surface 68 and an outer surface 70, the longitudinal flange 52 extending radially inwardly from the body 66, and a plurality of traction lugs extending radially outwardly from the body 66 and spaced circumferentially around the tire 32. The tire 32 may also include a plurality of drive lugs 64 extending radially inwardly from the body spaced circumferentially around the tire 32, as explained above. The flange 52 corresponds to an axially central portion of the tire body 66 and is continuous or substantially continuous around the tire 32. The flange 52 is configured to engage and partially or completely fill the channel 50 of the wheel 30 such that a central portion of the tire 32 including the flange 52 presents a greater radial depth or thickness than side portions of the tire 32. When the tire 32 is seated on the wheel 30, the flange 52 extends into the channel 50 and completely or partially conforms to the size and shape of the channel 50. When the tire 32 is subject to ground engaging pressure at least a portion of the flange 52 compresses, thereby allowing the tire 32 to deflect inwardly between the rim portions 42, 44 such that the outer surface 70 of the tire body 66 is transversely concave, as illustrated in FIG. 6.

As used herein, "ground engaging pressure" refers to pressure exerted on the wheel assembly 22 by the ground when the wheel assembly 22 is at rest on the ground or rolling on the ground during normal or anticipated use. Ground engaging pressure may include pressure exerted on the wheel assembly 22 from different directions or from multiple directions simultaneously, such as where the wheel assembly 22 is on inclined terrain or rolling over an obstacle. Ground engaging pressure is related to the weight of the wheel assembly 22 and to the weight of any machinery supported by the wheel assembly 22, and thus will vary from one embodiment of the invention to another and from one implementation to another.

Figure 7:
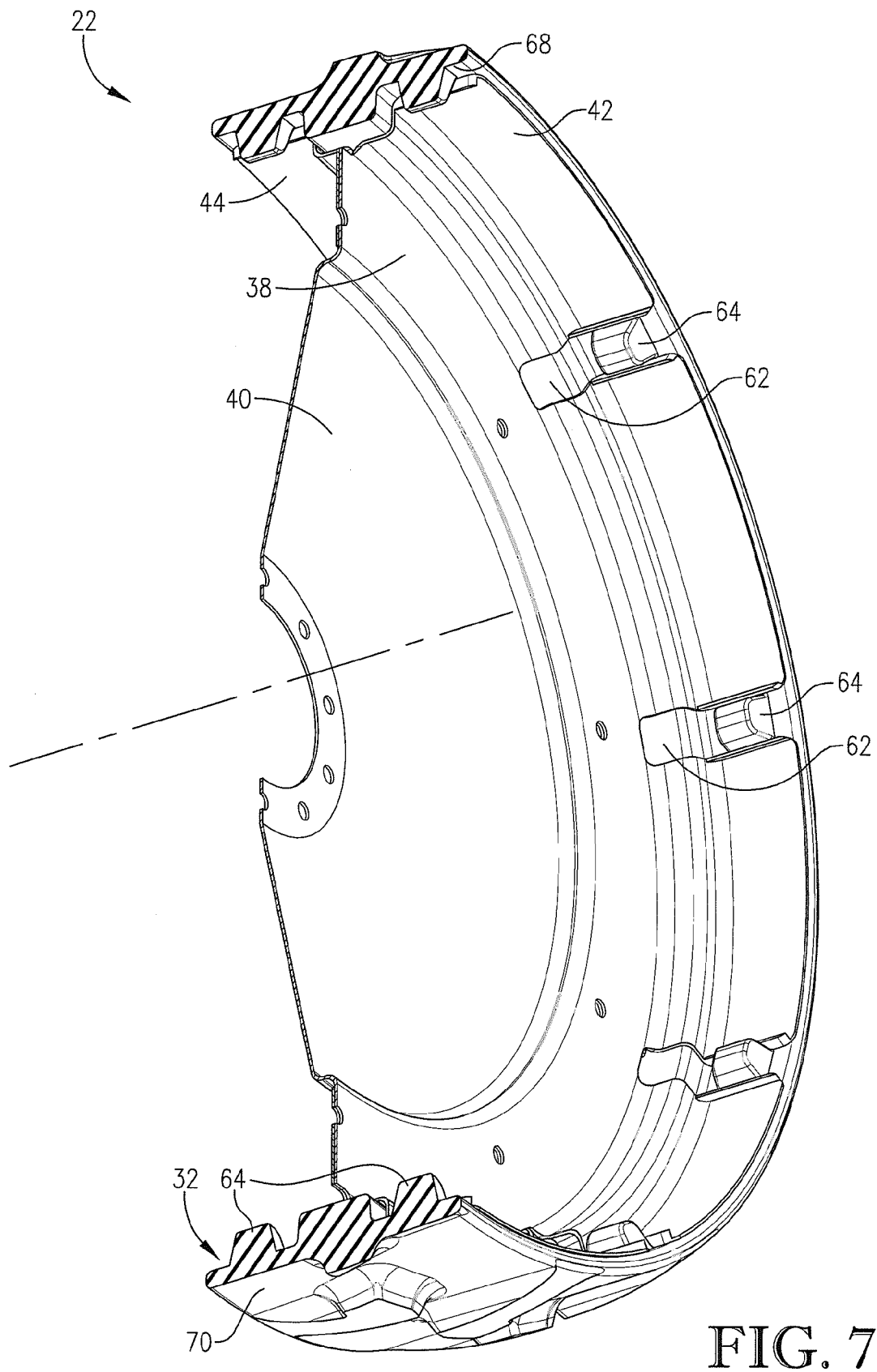
FIG. 7 is a fragmentary view of the wheel assembly of FIG. 2, illustrating a plurality of drive lugs of the tire engaging corresponding receptacles in the wheel.
Figure 8:
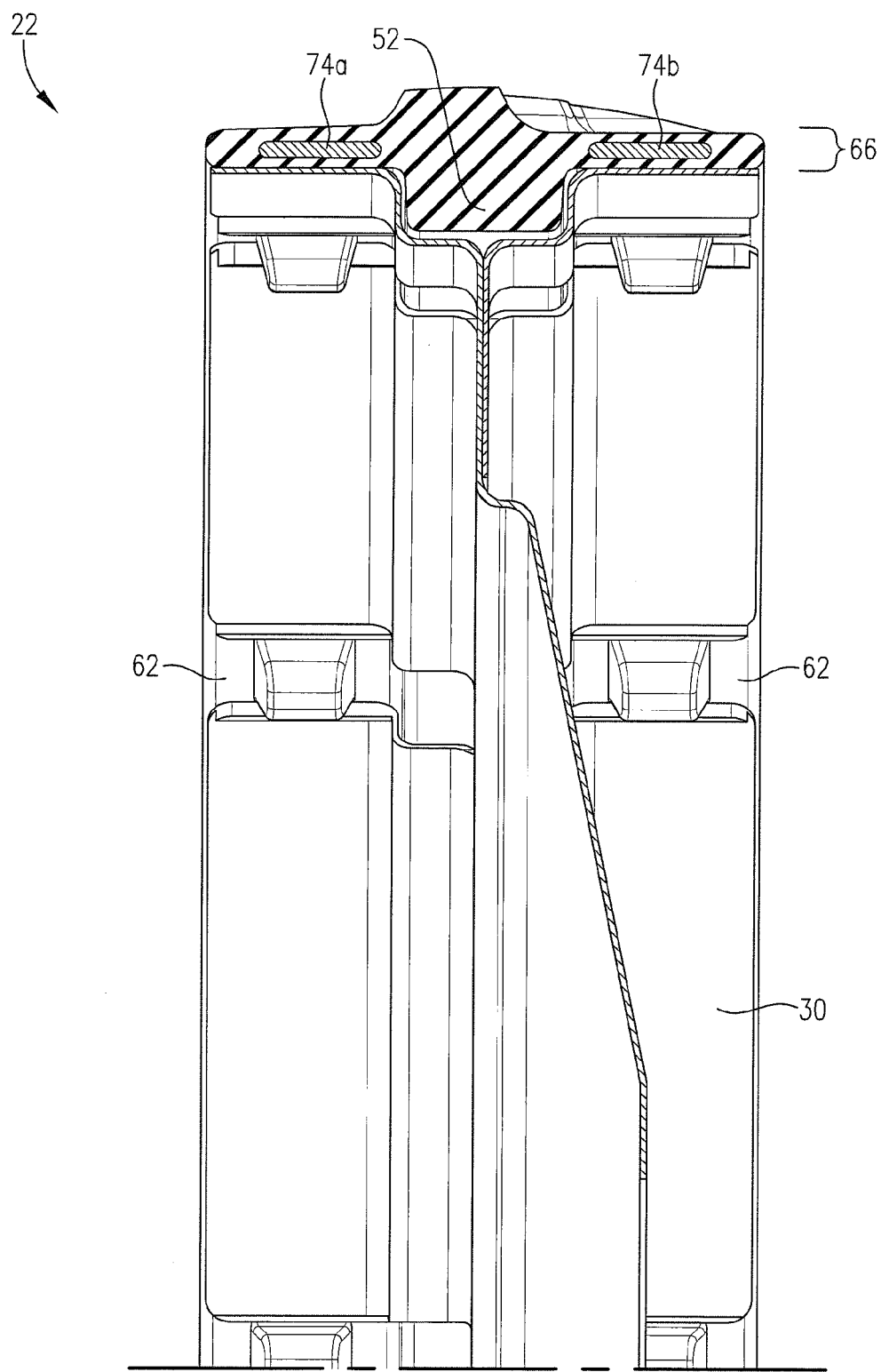
FIG. 8 is a fragmentary cross-sectional view of the wheel assembly of FIG. 2, illustrating tension members embedded in side portions of the tire and extending longitudinally around a circumference of the tire.
Figure 9:
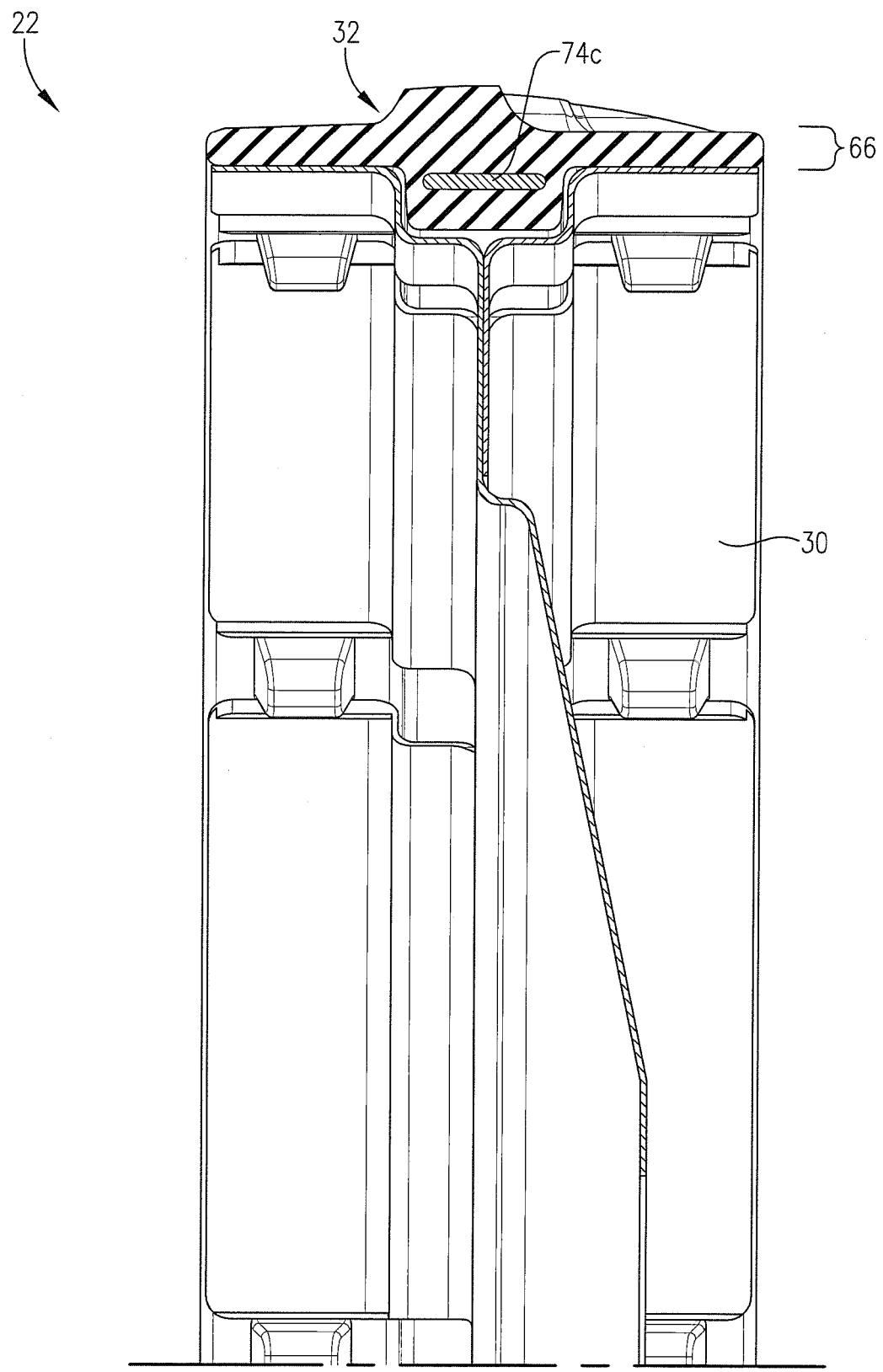
FIG. 9 is a fragmentary cross-sectional view of the wheel assembly of FIG. 2, illustrating a tension member embedded in a central portion of the tire and extending longitudinally around a circumference of the tire.

The outer surface 70 of the tire body 66 is transversely flat or presents a slightly arcuate transverse profile, such as a slightly convex transverse profile. The inner surface 68 of the tire body 66 is also transversely flat, and portions of the inner surface 68 corresponding to axial sides of the tire engage the outer surfaces 46, 48 of the outer rim walls of the wheel 30. With particular reference to FIGS. 7 and 8, one or more tension elements 74 may be secured to the tire 32. As used herein, a tension element 74 is "secured to" the tire 32 if it is partially or completely embedded in the tire 32 or otherwise attached to the tire 32. A first tension element 74a may be placed in a first axial side of the tire body 66 and a second tension element 74b may be placed in a second side of the tire body 66, as illustrated in FIG. 8. Alternatively, a single tension element 74c may be located in a central portion of the tire 32, as illustrated in FIG. 9, and may be placed in the body 66 of the tire 32, in the flange 52, or in an intermediate region between the body 66 and the flange 52. The tension elements 74 are preferably completely embedded in the tire 32, as illustrated.

The tension elements 74 are preferably more resilient than the material used to construct the tire 32 such that the one or more tension elements 74 increase the overall resilience of the tire 32, strengthening the structure of the tire 32 and enabling the tire 32 to return to its original shape after being subject to deflection or compression during use. The one or more tension elements 74 may be constructed of metal, such as spring steel, or other resilient and durable material. More particularly, each of the tension elements 74 may be a steel hoop, cable or ribbon constructed of a solid piece of metal or of multiple bonded or braided metal elements. The tension elements 74 may present a width that is between 0.05 and 0.5 times a total width of the tire 32, such as 0.1, 0.2 or 0.3 times the total width of the tire 32.

Figure 10:
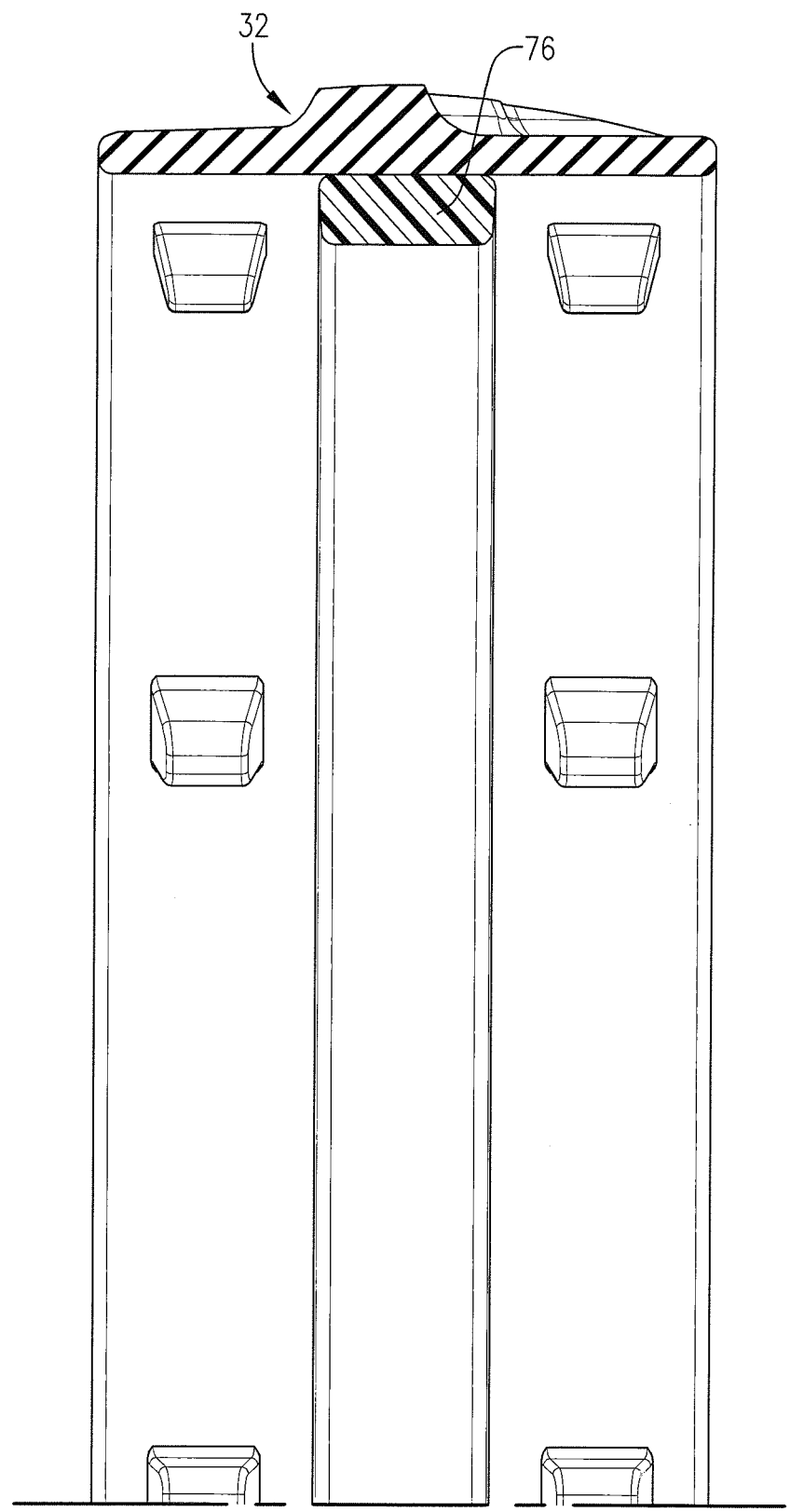
FIG. 10 is a cross-sectional view of the tire of the wheel and assembly of FIG. 2, illustrating the a flange of the tire constructed of a different material than a body of the tire.

To facilitate the compression of the flange 52 and the inward flexing of the tire 32, all or a portion of the flange 52 may be constructed of a material that is softer than the tire body 66, as illustrated in FIG. 10. More particularly, all or a portion 76 of the flange 52 may be constructed of a material with a Shore A hardness value that is one-fourth, one-third, one-half, two-thirds or three-fourths the Shore A hardness value of the material used to construct the tire body 66. By way of example, if the tire body 66 is constructed of a material with a Shore A hardness within the range of 55 to 75, the flange 52 may be constructed of a material with a Shore A hardness within the range of 30 to 40.

Figure 11:
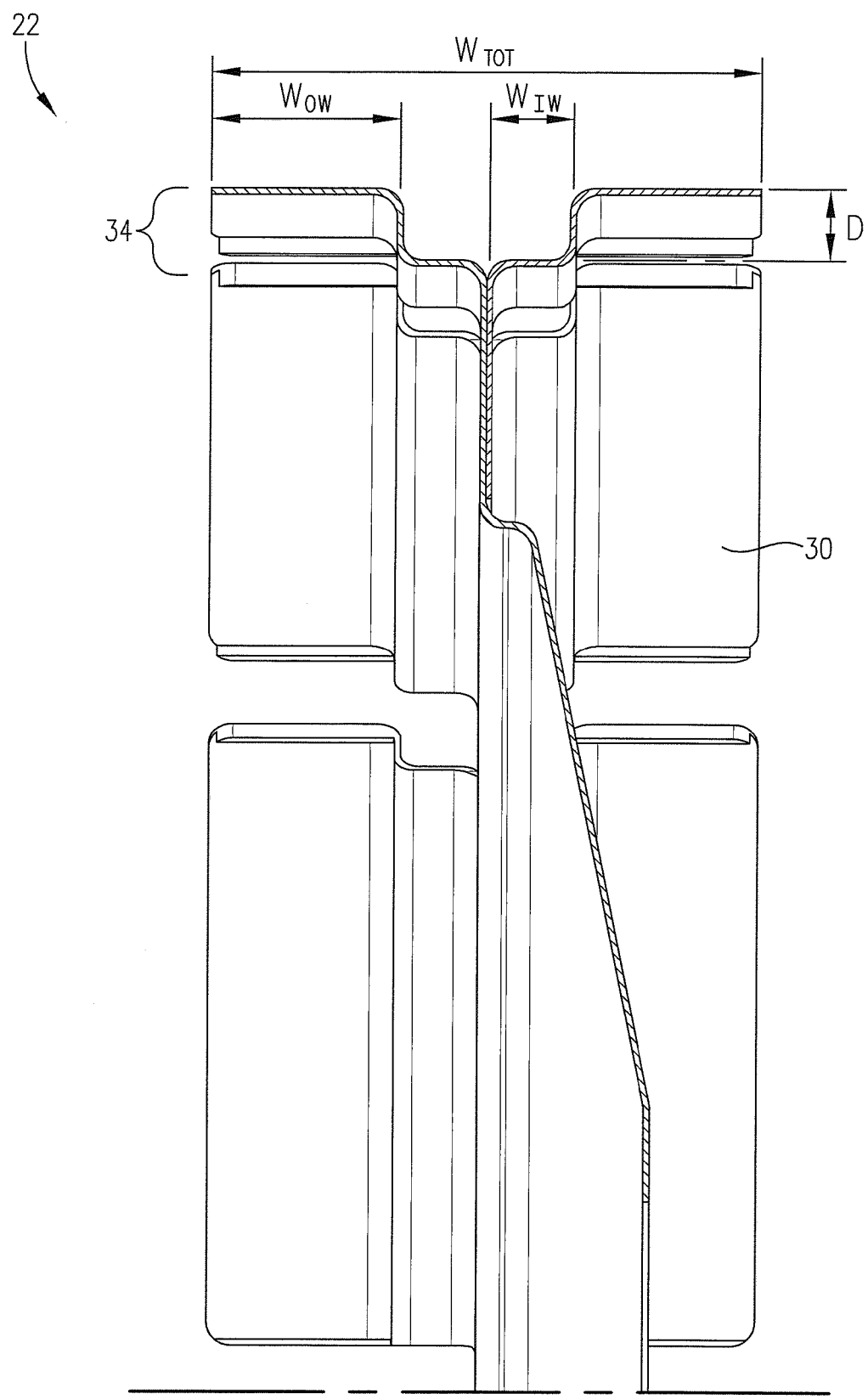
FIG. 11 is a fragmentary cross-sectional view of the wheel of the wheel assembly of FIG. 2.
Figure 12:
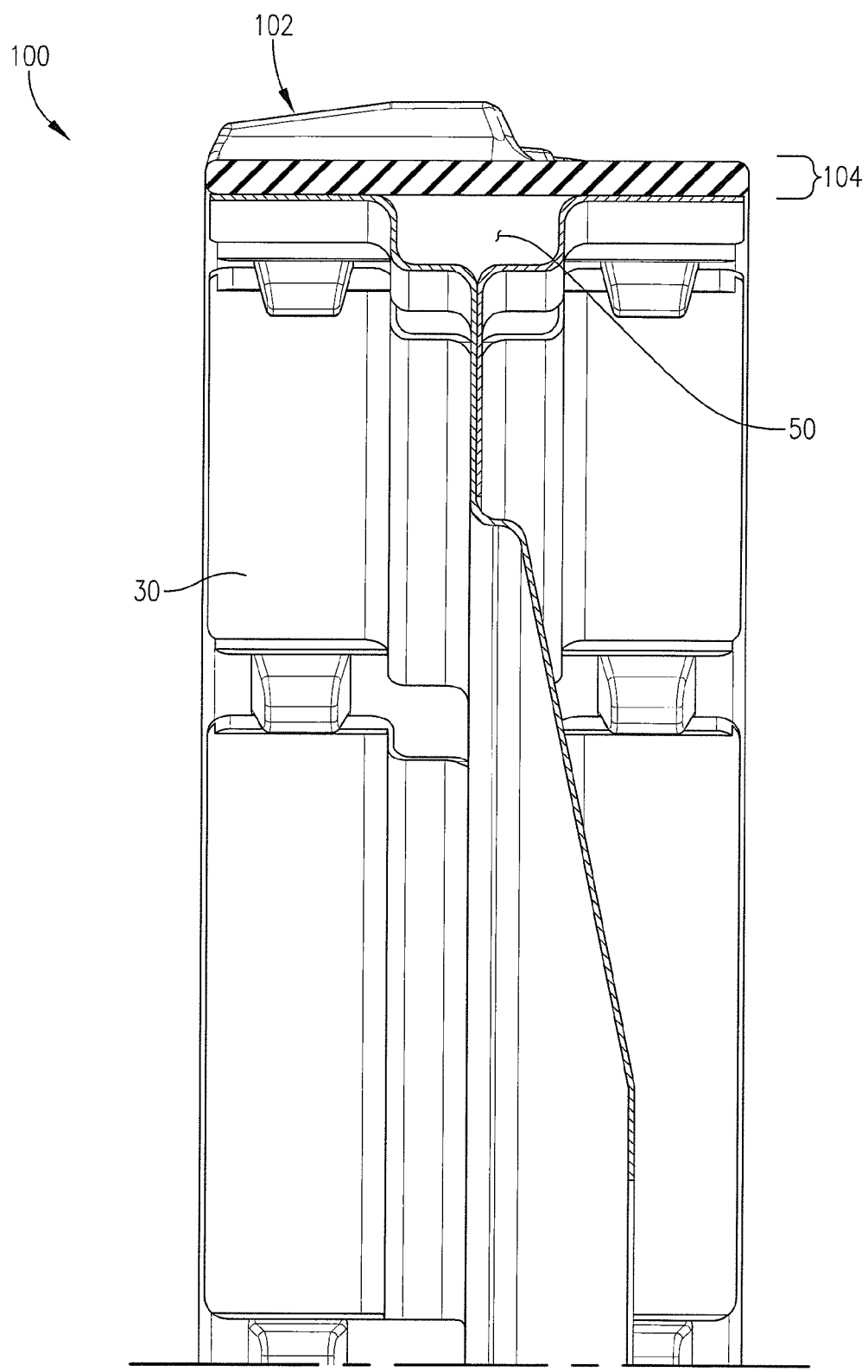
FIG. 12 is a fragmentary cross-sectional view of a second wheel assembly constructed in accordance with embodiments of the invention and useful with the irrigation system of FIG. 1, the wheel assembly including a rigid wheel and an airless tire.

The size and proportions of the wheel assembly 22 may vary substantially from one embodiment of the invention to another without departing from the spirit and scope of the invention. Thus, while various dimensions and proportions of certain embodiments of the wheel 30 and the tire 32 are discussed in this document, it will be understood that the dimensions and proportions are exemplary, and not limiting, in nature. An outer diameter of the wheel 30 (in the illustrated embodiment, the outer diameter of the wheel 30 corresponds to the diameter of the cylindrical shapes formed by the outer surfaces 46, 48 of the rim portions 42, 44) is preferably within the range of from about twenty-four inches to about sixty inches and more preferably within the range of from about thirty-six inches to about forty-eight inches. The outer diameter of the wheel 30 may particularly be about forty inches, about forty-two inches or about forty-four inches. With particular reference to FIG. 11, a total width $W_{TOT}$ of the tire engaging portion 34 of the wheel 30 is preferably within the range of from about six inches to about eighteen inches, more preferably within the range of from about eight inches to about sixteen inches, and may particularly be about ten inches, about twelve inches or about fourteen inches.

A width $W_{OW}$ of each of the outer rim walls 60 and 60', including the outer surfaces 46 and 48, is preferably between about 0.10 and about 0.4 times the total width $W_{TOT}$ of the tire engaging portion 34, and more preferably between about 0.2 and about 0.3 times the total width $W_{TOT}$. The width $W_{OW}$ of each of the outer rim walls 60 and 60' may particularly be about one-fourth of the total width $W_{TOT}$. A width $W_{IW}$ of each of the inner rim walls 56 and 56' is preferably between about 0.05 and about 0.3 times the total width $W_{TOT}$ of the tire engaging portion 34, and more preferably between about 0.1 and 0.2 times the total width $W_{TOT}$. The width $W_{IW}$ of each of the inner rim walls 56 and 56' may particularly be about 0.15 times the total width $W_{TOT}$. A depth D of the channel 50 is preferably between about 0.05 and 0.3 times the total width $W_{TOT}$ of the tire engaging portion 34, and more preferably between about 0.1 and 0.2 times the total width $W_{TOT}$. The depth D of the channel 50 may particularly be about 0.15 times the total width $W_{TOT}$. Each of the inner rim walls 56 and 56', connecting segments 58 and 58' and outer rim walls 60 and 60' is preferably between about one-eighth of an inch and one-half of an inch thick.

In one exemplary embodiment of the invention, the total width $W_{TOT}$ of the tire engaging portion 34 of the wheel 30 is about twelve inches, the width $W_{OW}$ of each of the outer rim walls 60 and 60' is about three inches, the width $W_{IW}$ of each of the inner rim walls 56 and 56' is about two inches, and the depth D of the channel 50 is about one and three-quarters inches.

The flange portion 38, which comprises both the first flange 38a and the second flange 38b, presents a radial depth that is preferably between 0.2 and 0.6 times the total width $W_{TOT}$ of the tire engaging portion 34 of the wheel 30, and may particularly be about 0.3, 0.4 or 0.5 times the total width $W_{TOT}$. The radial depth of the flange portion 38 may be between 0.05 and 0.2 times the outer diameter of the wheel 30, and may particularly be about 0.1 times the outer diameter of the wheel 30. The radial depth of the flange portion 38 is the difference between an inner radius and an outer radius of the flange portion 38.

The thickness of the tire body 66 is preferably within the range of from about one-half inch to about three inches and more preferably within the range of from about one inch to about two inches. The thickness of the tire body 66 may particularly be about one and one-quarter inches, about one and one-half inches or about one and three-quarters inches. The ratio of the width of the tire body 66 to the thickness of the tire body 66 is preferably between about three and about twenty, more preferably between five and fifteen, and may particular by about eight, about ten or about twelve.

The wheel 30 is assembled by placing each of the first side 30a and the second side 30b in engagement with the tire 32 such that the outer surfaces 46, 48 of the rim portions 42, 44 engage opposing side portions of the inner surface 70 of the tire body 66, the drive lugs 64 engage the receptacles 62 of the wheel 30, and the flange 38a of the first side 30a of the wheel engages the flange 38b of the second side 30b of the wheel 30. The sides 30a, 30b of the wheel are then secured in place by replacing the fasteners in the flanges 38a, 38b to secure the flanges 38a, 38b in a locking relationship.

As described and illustrated herein, the sides 30a, 30b of the wheel are separably or removably attached, meaning the sides 30a, 30b are structurally distinct pieces that may be separated and rejoined without altering the structure of either piece. In some embodiments of the invention, it may be difficult or impossible to mount the tire 32 onto the wheel 30 without damaging the tire 32 if the wheel 30 were not separated into component parts.

Figure 13:
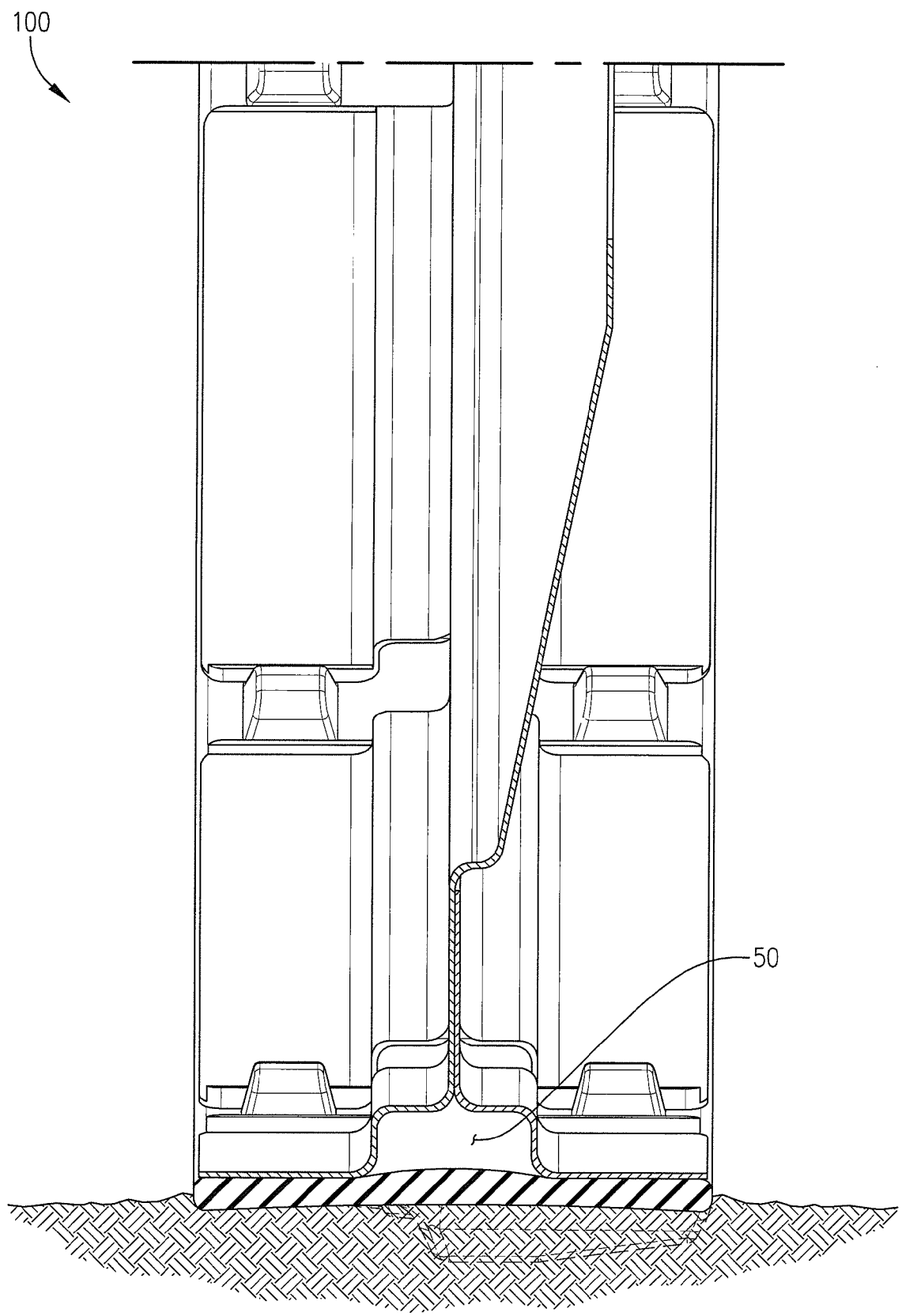
FIG. 13 is a fragmentary cross-sectional view of the wheel assembly of FIG. 12, illustrating the tire engaging the ground and flexing inwardly in response to ground engaging pressure.
Figure 14:
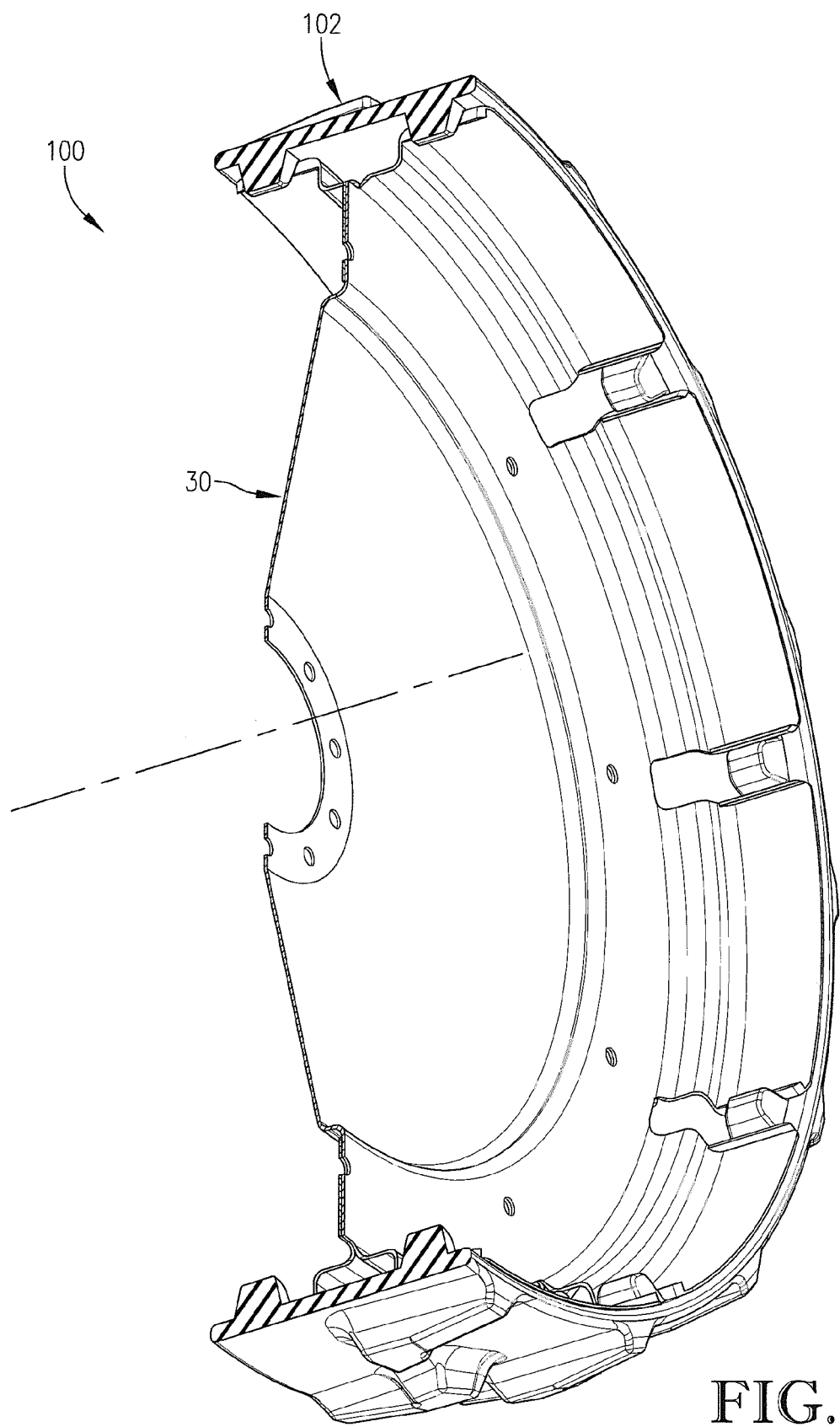
FIG. 14 is a cross-sectional view of the wheel assembly of FIG. 12, illustrating a plurality of drive lugs of the tire engaging corresponding receptacles in the wheel.

A wheel assembly 100 constructed in accordance with a second embodiment of the invention is illustrated in FIGS. 12-16. The wheel assembly 100 may include the wheel 30 and an airless tire 102 identical to the tire 32 described above in form and function, except that the tire 102 does not have a structure similar to the flange 52 extending radially inwardly from a body 104 of the tire 102. Rather, the channel 50 of the wheel 30 presents an open space under the tire 102 such that the tire 102 deflects into the channel when subject to ground-engaging pressure, as illustrated in FIG. 13.

Figure 15:
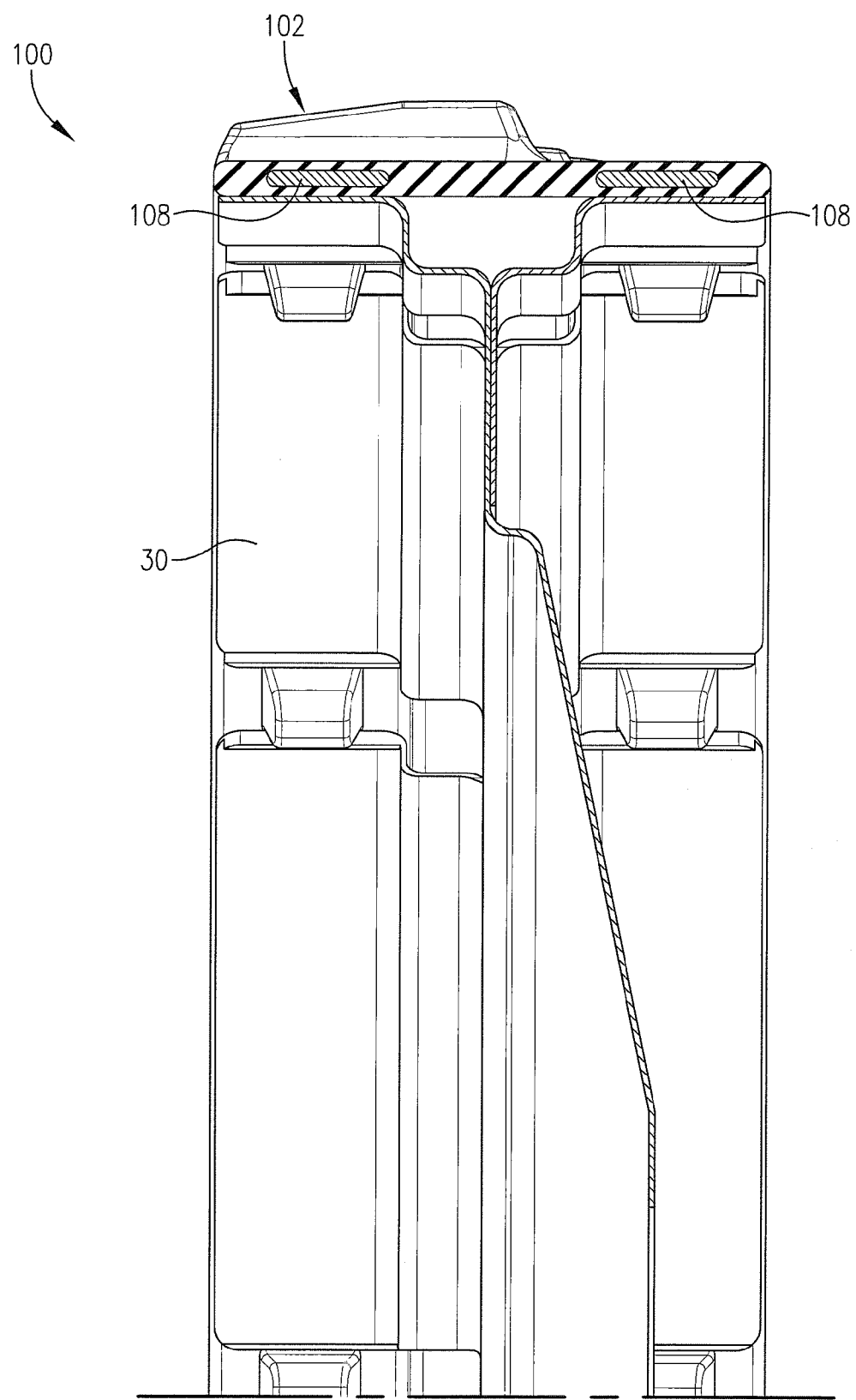
FIG. 15 is a fragmentary cross-sectional view of the wheel assembly of FIG. 12, illustrating tension members embedded in side portions of the tire and extending longitudinally around a circumference of the tire.
Figure 16:
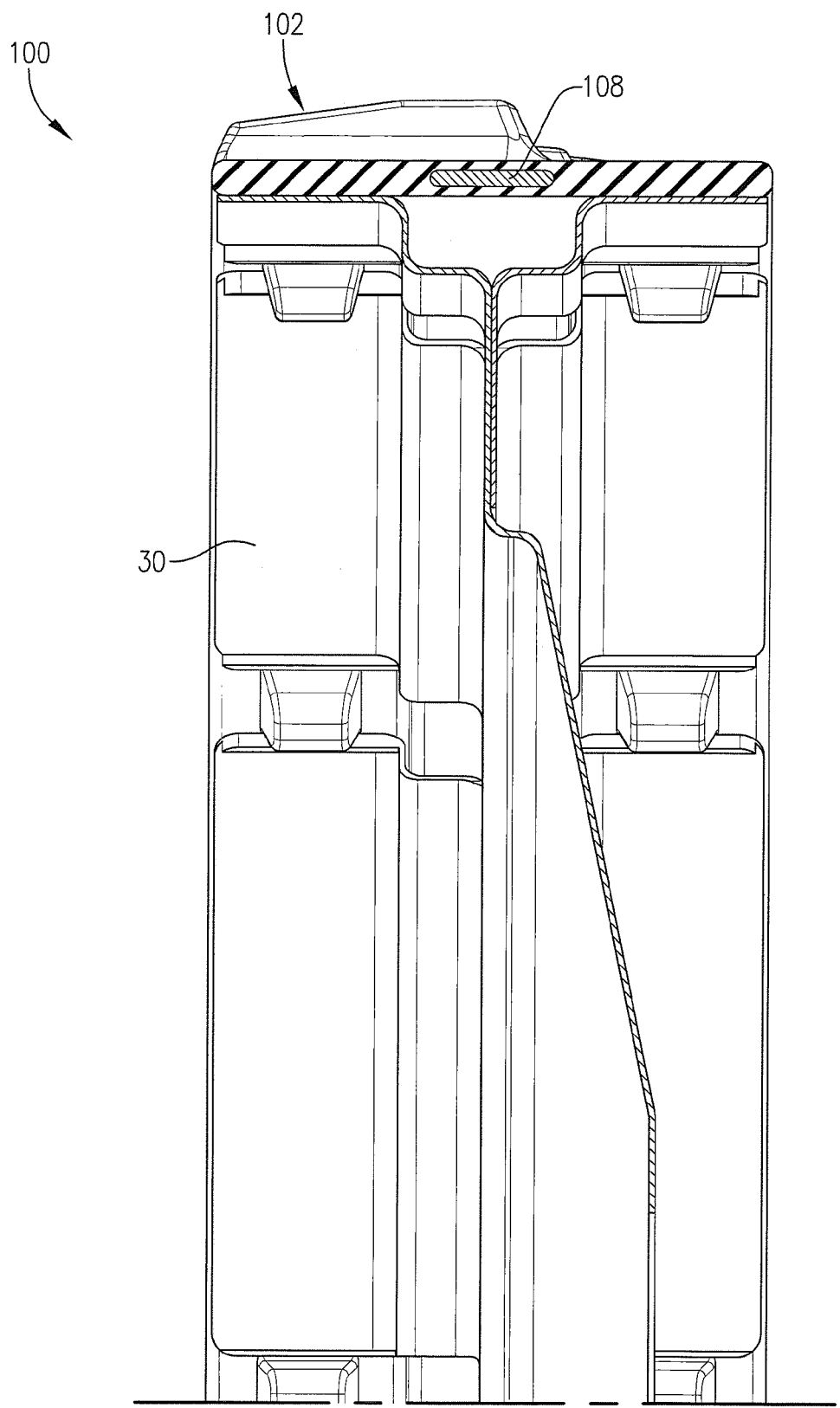
FIG. 16 is a fragmentary cross-sectional view of the wheel assembly of FIG. 12, illustrating a tension member embedded in a central portion of the tire and extending longitudinally around a circumference of the tire.

The tire 102 may include one or more tension elements 108, as illustrated in FIGS. 15 and 16. Each of the tension elements 108 may be similar or identical to the tension elements 74 described above in size, shape and composition. The tire 102 may include a pair of tension elements 108 embedded in opposing axial sides of the tire 102, as illustrated in FIG. 15, or may include a single tension member 108 embedded in an axially central portion of the tire 102, as illustrated in FIG. 16.

Figure 17:
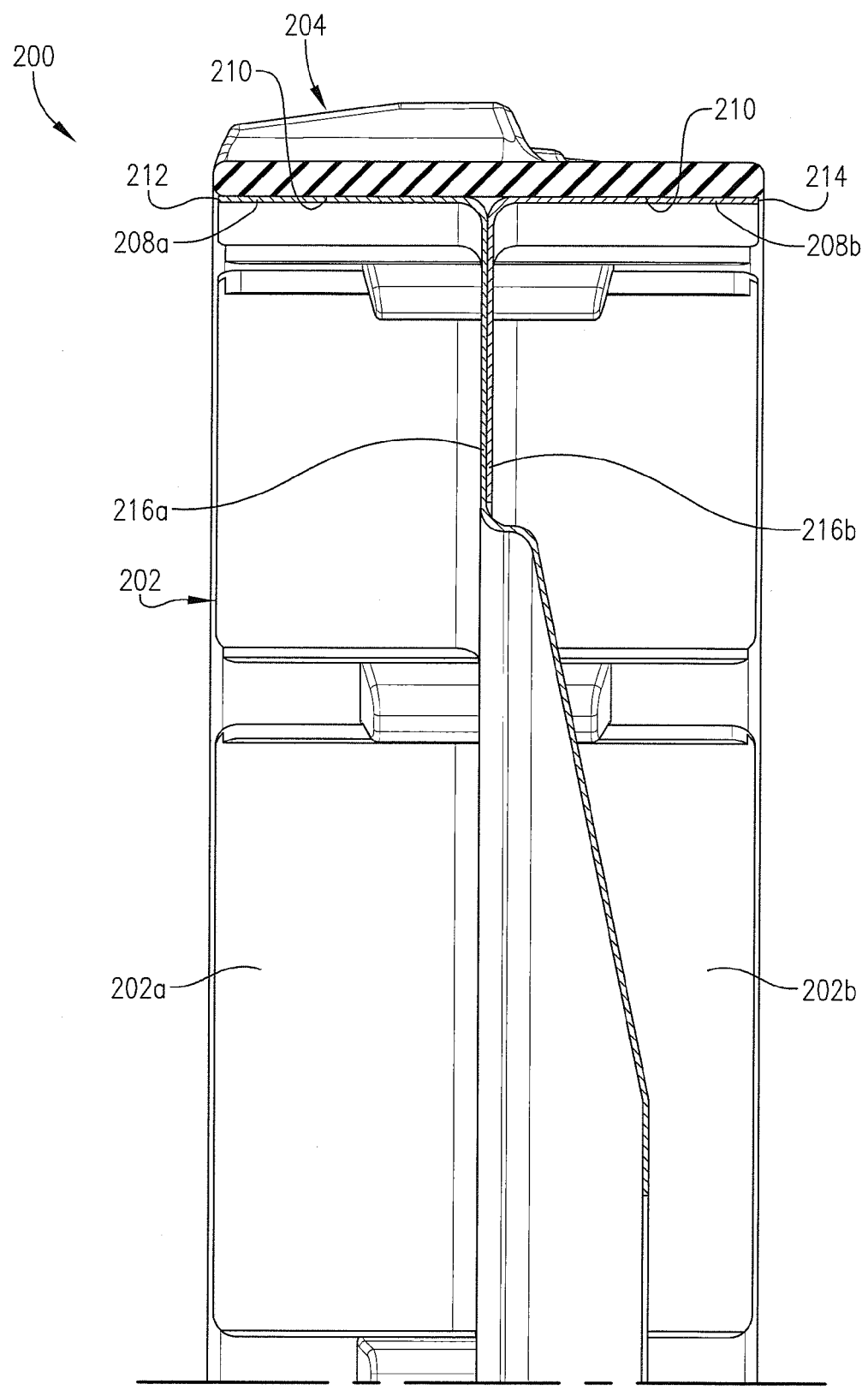
FIG. 17 is a fragmentary cross-sectional view of a third wheel assembly constructed in accordance with embodiments of the invention and useful with the irrigation system of FIG. 1, the wheel assembly including a rigid wheel and an airless tire.
Figure 18:
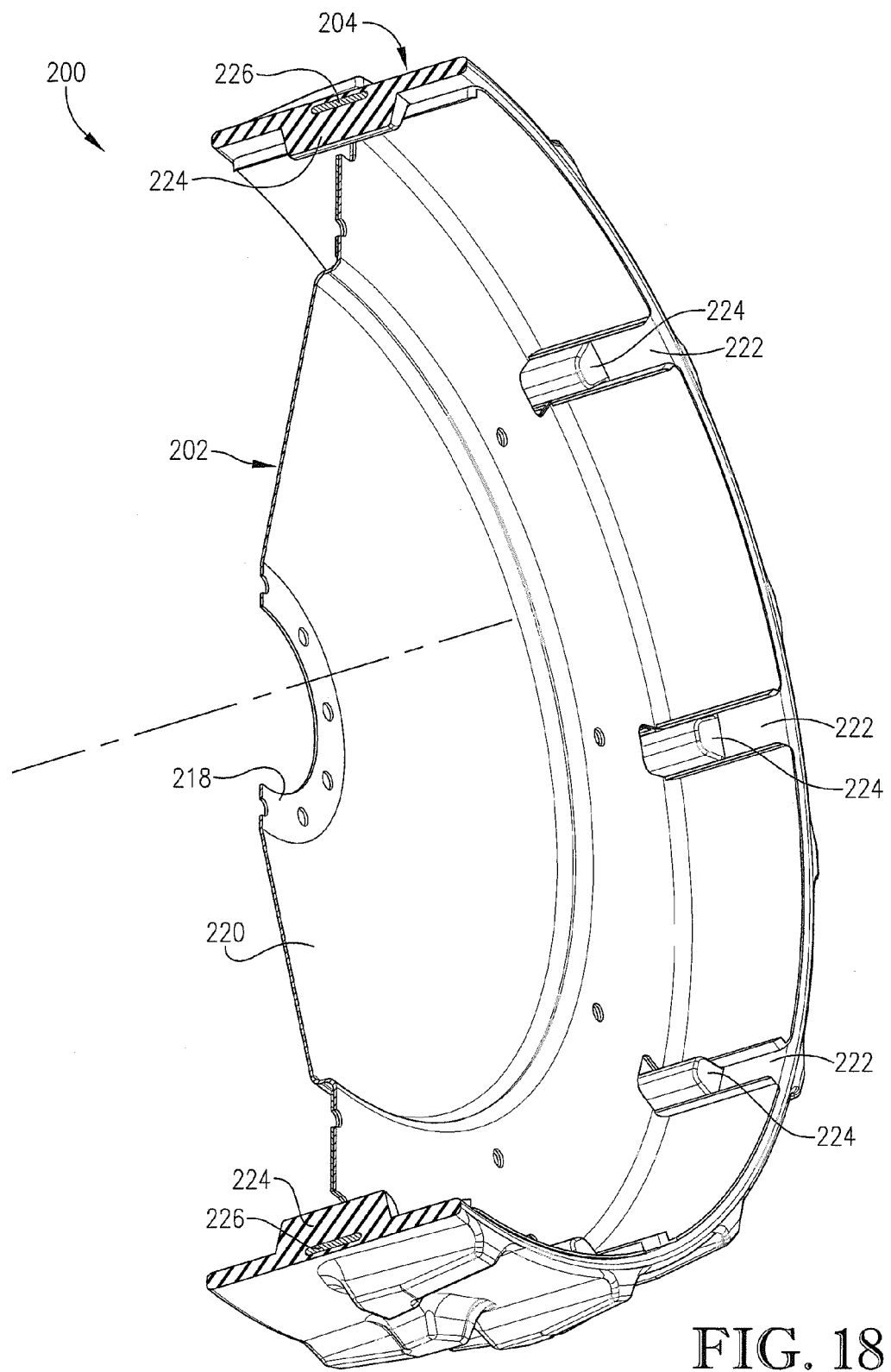
FIG. 18 is a fragmentary view of the wheel assembly of FIG. 17, illustrating a plurality of drive lugs of the tire engaging corresponding receptacles in the wheel.
Figure 19:
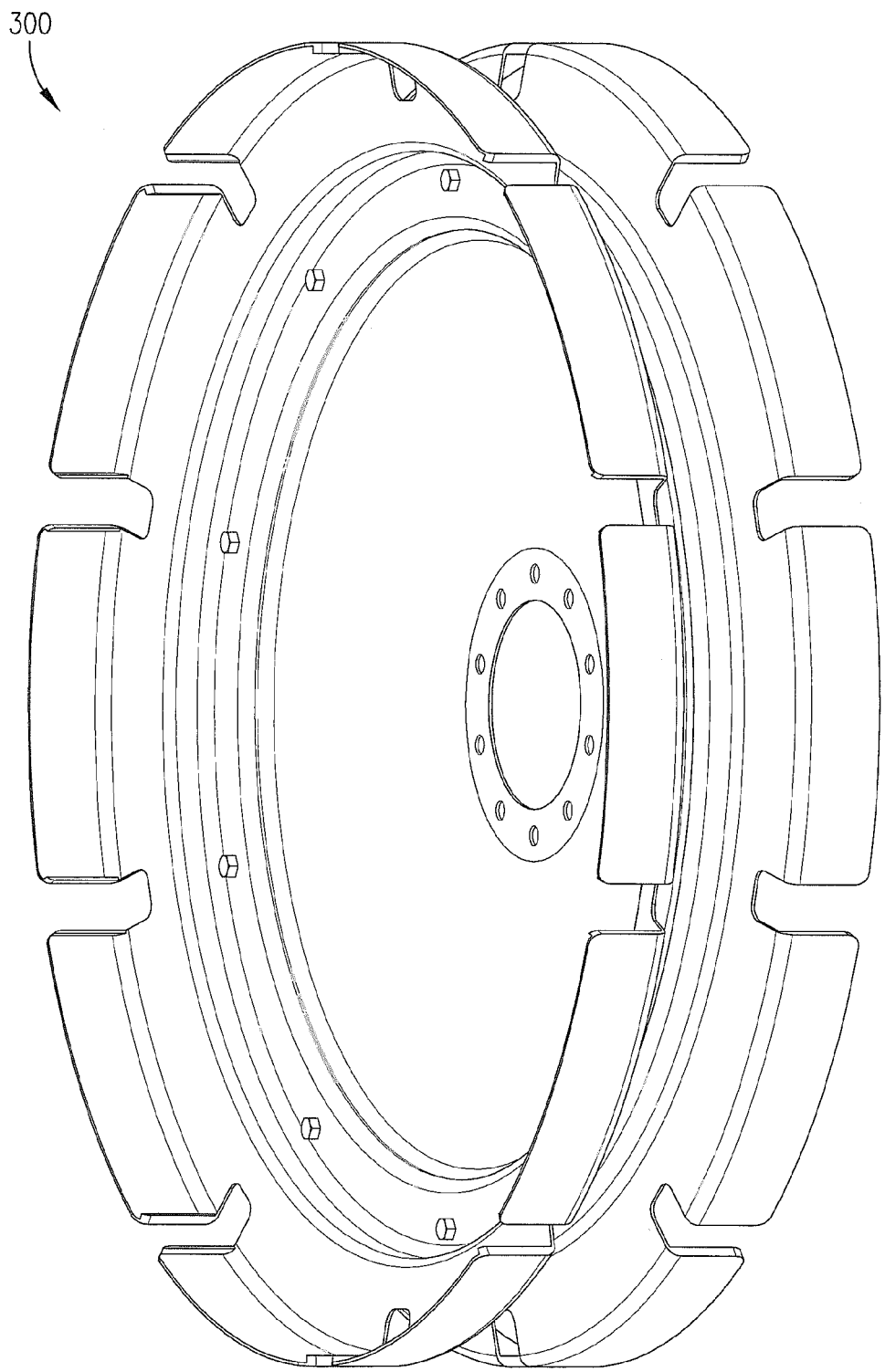
FIG. 19 is a perspective side view of a wheel of a fourth wheel assembly constructed in accordance with embodiments of the invention and useful with the irrigation system of FIG. 1, the wheel including an enlarged central channel.

A wheel assembly 200 constructed in accordance with a third embodiment of the invention is illustrated in FIGS. 17 and 18. The wheel assembly 200 includes a wheel 202 and an airless tire 204. The wheel 202 is similar to the wheel 30 described above, except that the wheel 202 includes a tire engaging portion 206 that does not have a channel but rather presents a substantially uniform, transversely flat outer rim wall 208 comprising two sides, 208a and 208b. The rim wall 208 presents an outer surface 210 that is substantially transversely flat from a first edge 212 of the wheel 202 to a second edge 214 of the wheel 202.

The wheel comprises two axial sides 202a, 202b. A first side 202a includes a first half 208a of the rim wall, a flange 216a, a central hub 218, and a web portion 220 that extends from the hub 218 to the flange 216a. The flange 216a is similar to the flange 20a described above in both form and function and, in the illustrated embodiment, is substantially perpendicular to the axis of rotation of the wheel 202. The first half 208a of the rim wall extends axially outwardly from a radially outer edge of the flange 216a to a first edge 212 of the wheel 202. The rim wall 208a is perpendicular to the flange 216a and defines a cylindrical shape that is parallel with the axis of rotation of the wheel 202. The second side 202b of the wheel is symmetrically identical to the first side 202a of the wheel except that the second side 202b does not include a hub or a web portion. Rather, the second side 202b comprises a flange 216b and a second half 208b of the rim wall.

The wheel 202 includes a plurality of receptacles 222 for engaging drive lugs 224 of the tire 204. The receptacles 222 may be defined by slots or recesses in the rim wall 208 and the flanges 216a, 216b. The tire 204 is similar the tire 102 described above in size and shape, except that the tire 204 includes a plurality of drive lugs 224 each positioned in an axial central portion of the tire 204. The tire 204 may further include one or more tension elements 226 positioned in a central portion of the tire 204, as illustrated, or on opposing axial sides of the tire 204.

A wheel assembly 300 constructed in accordance with a fourth embodiment of the invention is illustrated in FIGS. 19-22. The wheel assembly 300 comprises a wheel 302 and the flexible airless tire 32 mounted on the wheel 302. Some aspects of the wheel 302 are identical to the wheel 30 described above, therefore for the sake of simplicity only the differences are discussed.

A tire engaging portion 304 is configured to engage and support the tire 32 and to allow a portion of the tire 32 to flex radially inwardly in response to ground engaging pressure. More particularly, the tire engaging portion 304 presents a pair of axially spaced rim portions 306, 308 configured to engage and support axially opposing sides of the tire 32. Each of the rim portions 306, 308 presents a radially outer surface that extends substantially entirely around the circumference of the wheel, being interrupted only by a plurality of receptacle apertures. The total width of the tire engaging portion 304 and the outer diameter of the wheel 302 may be similar or identical to the corresponding dimensions of the wheel 30 described above.

A recessed area between the rim portions 306, 308 forms a channel 310 that is similar in form and function to the channel 50 described above, except that the channel 310 is generally wider and deeper than the channel 50, allowing the tire 32 to freely flex into the channel 310 without engaging the channel walls. In the illustrated embodiment, the ratio of the depth of the channel 310 to the total width of the tire engaging portion 304 is preferably within the range of from about 0.3 to about 0.6, and may particularly be about 0.4, about 0.45 or about 0.5. The ratio of the width of the channel 310 at an outer portion 312 to the total width of the tire engaging portion 304 is also preferably within the range of from about 0.3 to about 0.6, and may particularly be about 0.4, about 0.45 or about 0.5. The channel 310 may narrow somewhat between the outer portion 312 and an inner portion 314, such that the ratio of the width of the inner portion 314 to the width of the outer portion 312 is preferably within the range of from about 0.4 to about 0.8, more preferably within the range of from about 0.5 to about 0.7, and may particularly be about 0.55, about 0.6 or about 0.65.

Figure 20:
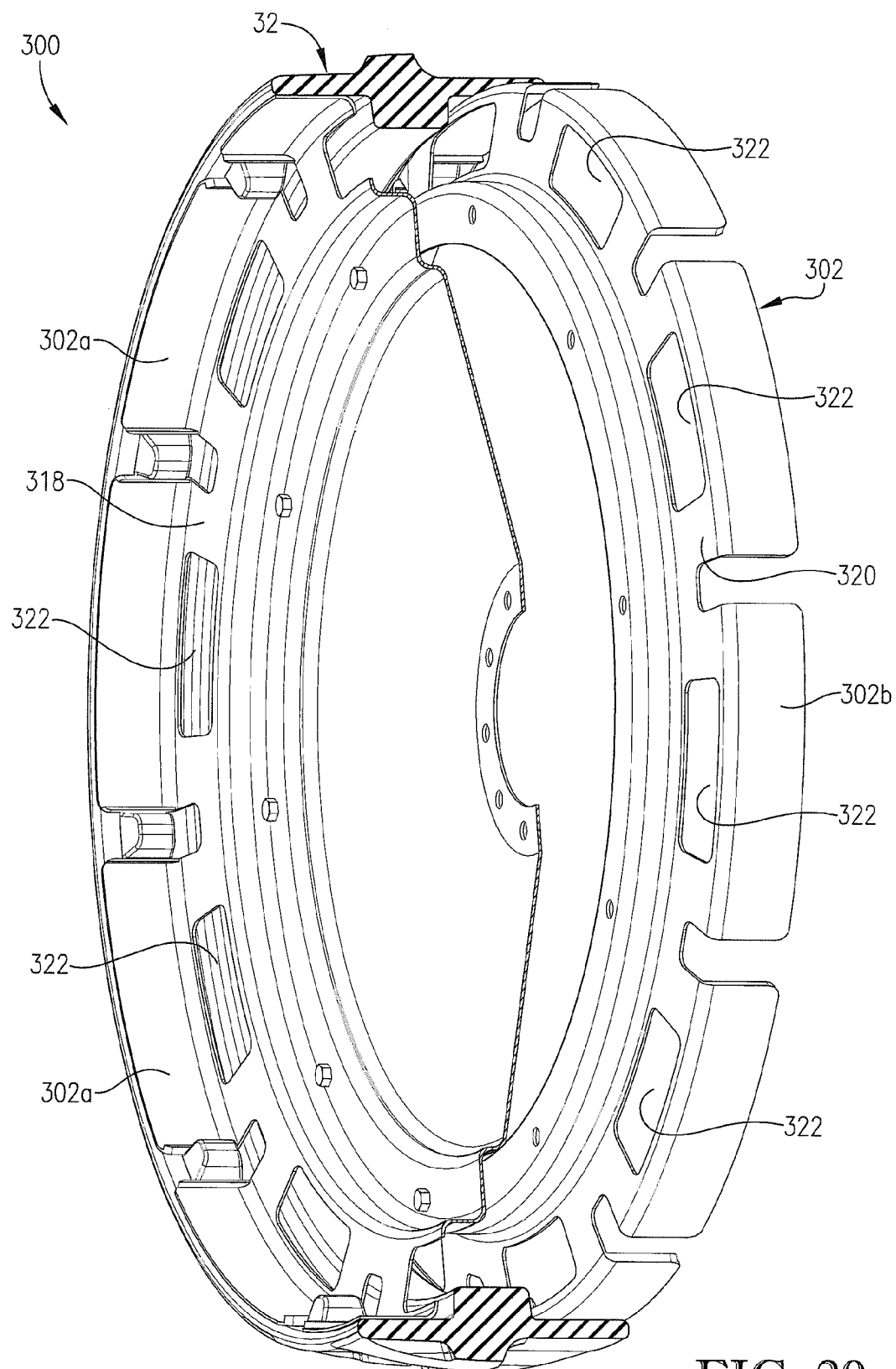
FIG. 20 is a perspective, partially fragmentary cross-sectional view of the wheel assembly of FIG. 19 illustrating the wheel and a tire mounted on the wheel.
Figure 21:
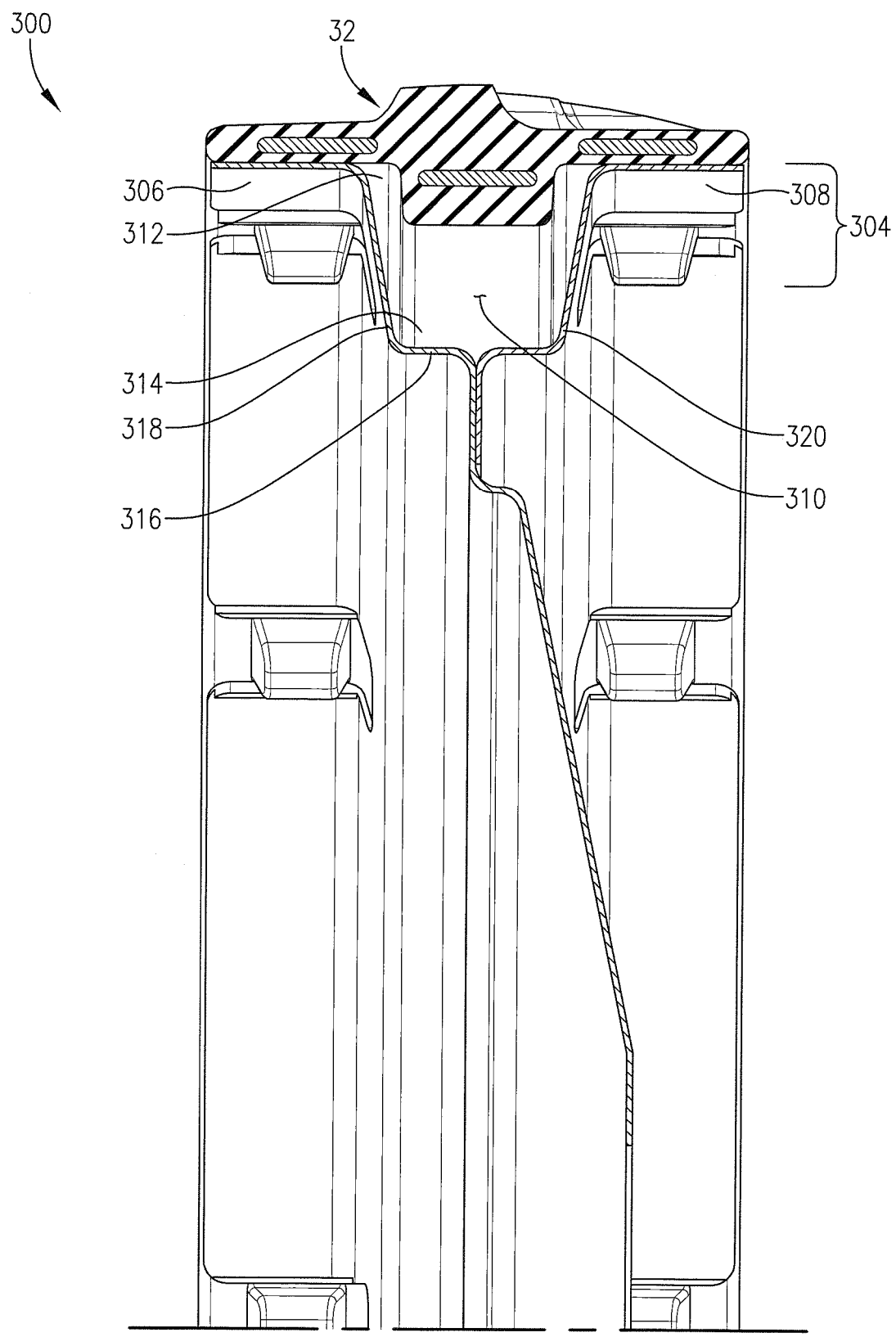
FIG. 21 is a fragmentary cross-sectional view of the wheel assembly of FIG. 19, illustrating tension members embedded in side portions and a central portion of the tire.
Figure 22:
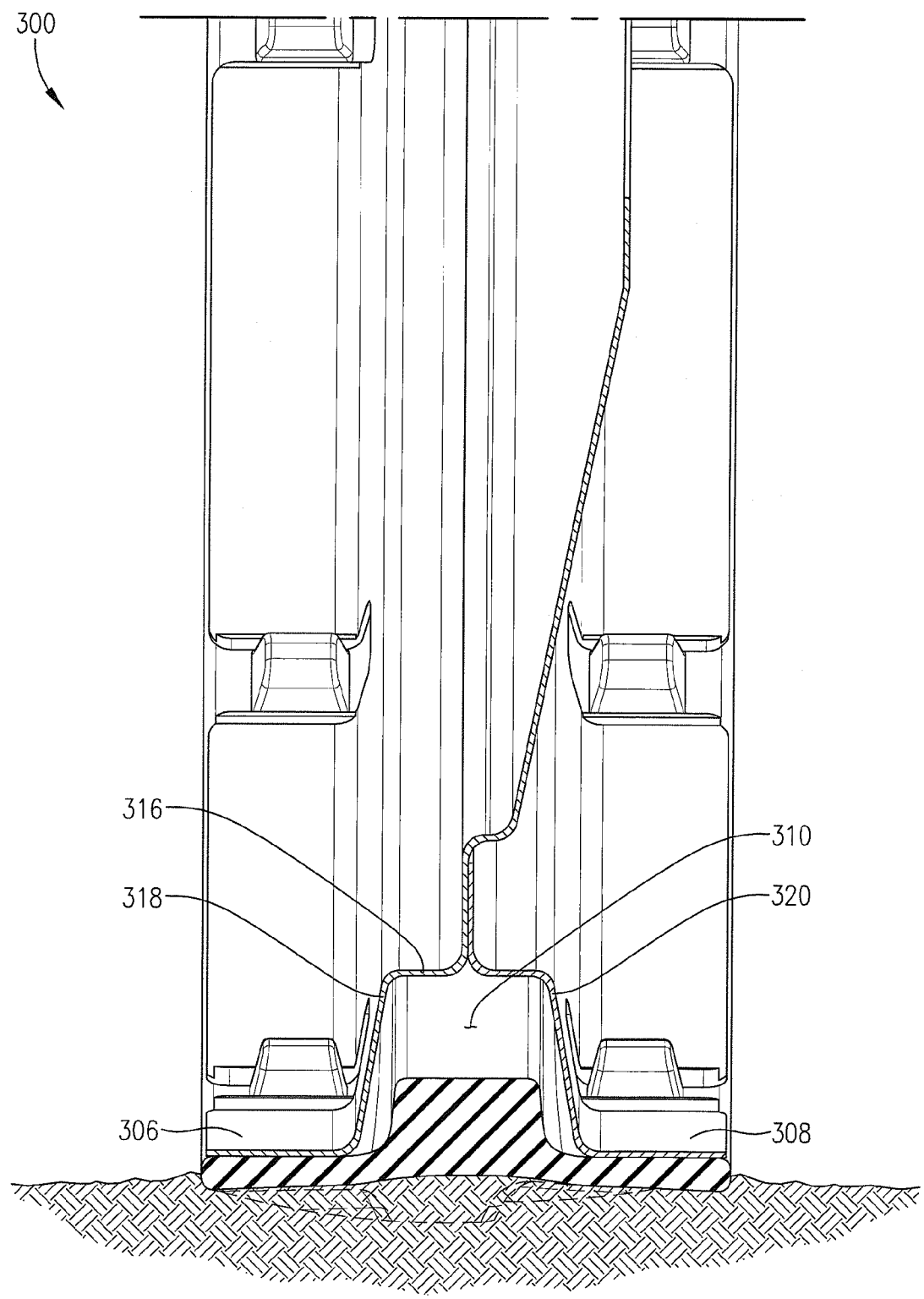
FIG. 22 is a fragmentary cross-sectional view of the wheel assembly of FIG. 19, illustrating the tire engaging the ground and flexing inwardly in response to ground engaging pressure.

The channel is defined by an inner wall 316 and a pair of opposing side walls 318, 320. Each of the side walls 318, 320 may include a plurality of apertures 322 spaced around the wheel 302, as illustrated in FIG. 20. The apertures 322 are preferably large enough to allow users to access the channel 310 to remove soil or other debris from inside the channel 320. The open structure of the channel 310 provided by the apertures 322 has other advantages as well. For example, it may limit the overall weight of the wheel assembly 300 and also allow users to inspect otherwise inaccessible portions of the tire 32 and the wheel 302.

The apertures 322 preferably cover between ten percent and eighty percent of each of the side walls 318, 320, and more preferably cover between twenty percent and seventy percent. Each of the apertures 322 may be between one-half inch and three inches wide, and between three inches and seven inches long.

Although the invention has been described with reference to the exemplary embodiments illustrated in the attached drawings, it is noted that equivalents may be employed and substitutions made herein without departing from the scope of the invention as recited in the claims. For example, while the flange has been described and illustrated herein is continuous around the tire it will be appreciated that the flange may comprise a plurality of separate segments.

Having thus described various embodiments of the invention, what is claimed as new and desired to be protected by Letters Patent include the following:

1. A wheel assembly comprising:
    a rigid wheel comprising:
        a first rim portion having a first radially outermost ring forming a central opening and including a first transversely flat outer surface extending at least partially around the circumference of the wheel and a first radially flat inner surface having a first innermost edge;
        a second rim portion configured to be axially connected to the first rim portion, the second rim portion having:
            a second radially outermost ring including a second transversely flat outer surface extending at least partially around the circumference of the wheel and a second radially flat inner surface having a second innermost edge;
            a central disc having an outermost edge and a central hub flange for connecting the second rim portion to a hub, the central disc being axially offset from the second radially flat inner surface; and
            an intermediate lip extending axially from the second innermost edge to the outermost edge of the central disc, the central disc being configured to be inserted through the central opening when the second radially flat inner surface is connected to the first radially flat inner surface such that the intermediate lip is adjacent the first innermost edge of the first radially flat inner surface; and
        an airless flexible tire mounted on the wheel such that the tire engages the outer surfaces of the rim portions of the wheel.

2. The wheel assembly of claim 1, the tire including a cylindrically-shaped body with a transversely flat outer side, the tire body presenting a width to thickness ratio of between 5 and 20.

3. The wheel assembly of claim 1, the tire being a single, solid piece of material of unitary construction.

4. The wheel assembly of claim 1, the wheel including a plurality of receptacles and the tire including a plurality of drive lugs for engaging the receptacles.

5. The wheel assembly of claim 1, the tire including a plurality of traction lugs, each traction lug presenting an elongated shape and extending transversely across at least a portion of an outer side of the tire.

6. The wheel assembly of claim 1, the tire including at least one tension element embedded in the tire, the tension element being more resilient than the tire material.

7. The wheel assembly of claim 6, the tension element being a metal element embedded in the tire and extending longitudinally around the tire.

8. The wheel assembly of claim 1, the combined width of the transversely flat outer surfaces of the rim portions being at least one-third of a total width of the wheel.

9. A wheel assembly comprising:
    a rigid wheel comprising:
        a first rim portion having a first radially outermost ring forming a central opening and including a first transversely flat outer surface extending at least partially around the circumference of the wheel and a first radially flat inner surface having a first innermost edge;
        a second rim portion configured to be axially connected to the first rim portion, the second rim portion having:
            a second radially outermost ring including a second transversely flat outer surface extending at least partially around the circumference of the wheel and a second radially flat inner surface having a second innermost edge, the outer surfaces being spaced from each other when the second radially flat inner surface is connected to the first radially flat inner surface so as to form an annular channel therebetween;
            a central disc having an outermost edge and a central hub flange for connecting the second rim portion to a hub, the central disc being axially offset from the second radially flat inner surface; and
            an intermediate lip extending axially from the second innermost edge to the outermost edge of the central disc, the central disc being configured to be inserted through the central opening when the second radially flat inner surface is connected to the first radially flat inner surface such that the intermediate lip is adjacent the first innermost edge of the first radially flat inner surface; and
    an airless flexible tire mounted on the wheel, the tire including:
        opposed axial side portions engaging the rim portions of the wheel; and
        an axially central portion configured to deflect inwardly into the annular channel in response to ground engaging pressure.

10. The wheel assembly of claim 9, the channel presenting a depth equal to at least one-third of the total width of the wheel.

11. A wheel assembly comprising:
    a rigid wheel comprising:
        a first rim portion having a first radially outermost ring forming a central opening and including a first transversely flat outer surface extending at least partially around the circumference of the wheel and a first radially flat inner surface having a first innermost edge;

a second rim portion configured to be axially connected to the first rim portion, the second rim portion having:

a second radially outermost ring including a second transversely flat outer surface extending at least partially around the circumference of the wheel and a second radially flat inner surface having a second innermost edge, the outer surfaces including a plurality of spaced apart axially-extending receptacles and being spaced from each other when the second radially flat inner surface is connected to the first radially flat inner surface so as to form an annular channel therebetween;

a central disc having an outermost edge and a central hub flange for connecting the second rim portion to a hub, the central disc being axially offset from the second radially flat inner surface; and an intermediate lip extending axially from the second innermost edge to the outermost edge of the central disc, the central disc being configured to be inserted through the central opening when the second radially flat inner surface is connected to the first radially flat inner surface such that the intermediate lip is adjacent the first innermost edge of the first radially flat inner surface;

an airless flexible tire mounted on the wheel, the tire including:

opposed axial side portions configured to engage the rim portions of the wheel;

an axially central portion configured to deflect inwardly into the annular channel in response to ground engaging pressure;

a plurality of spaced apart inwardly extending drive lugs configured to engage the spaced apart receptacles for keeping the tire rotationally aligned with the wheel; and a plurality of traction lugs, each traction lug presenting an elongated shape and extending transversely across at least a portion of an outer side of the tire; and at least one metal tension element embedded in the tire, the at least one tension element being more resilient than the tire and configured to enable the axially central portion of the tire to return to a normal position after deflecting inwardly.

\* \* \* \* \*